(12) United States Patent
Myers et al.

(10) Patent No.: US 11,982,377 B1
(45) Date of Patent: May 14, 2024

(54) FLUIDIC DEVICES

(71) Applicant: Meta Platforms Technologies, LLC, Menlo Park, CA (US)

(72) Inventors: Daniel Myers, Kirkland, WA (US); Serol Turkyilmaz, Kirkland, WA (US); Ali Darvishian, Lynn, MA (US); Robert Manson, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/050,899

(22) Filed: Oct. 28, 2022

Related U.S. Application Data

(60) Provisional application No. 63/315,636, filed on Mar. 2, 2022, provisional application No. 63/276,977, filed on Nov. 8, 2021.

(51) Int. Cl.
| | | |
|---|---|---|
| *F16K 99/00* | (2006.01) |
| *F16K 3/28* | (2006.01) |
| *F16K 7/12* | (2006.01) |
| *F16K 7/17* | (2006.01) |
| *F16K 31/126* | (2006.01) |
| *F16K 31/165* | (2006.01) |
| *F16K 41/12* | (2006.01) |

(52) U.S. Cl.
CPC ............ *F16K 99/0015* (2013.01); *F16K 3/28* (2013.01); *F16K 7/12* (2013.01); *F16K 7/17* (2013.01); *F16K 31/126* (2013.01); *F16K 31/165* (2013.01); *F16K 41/12* (2013.01); *F16K 99/0003* (2013.01); *F16K 99/0025* (2013.01); *F16K 99/0057* (2013.01); *F16K 2099/0082* (2013.01); *F16K 2099/0094* (2013.01)

(58) Field of Classification Search
CPC ............. F16K 99/0015; F16K 99/0003; F16K 99/0057; F16K 99/0025; F16K 2099/0082; F16K 2099/0094; F16K 3/28; F16K 7/12; F16K 7/17; F16K 31/126; F16K 31/165; F16K 41/12
USPC ....... 251/331, 61.1; 137/863, 884, 885, 859, 137/505.37, 115.17
See application file for complete search history.

(56) References Cited

U.S. PATENT DOCUMENTS

| | | | | |
|---|---|---|---|---|
| 3,844,529 | A | * | 10/1974 | Brandt, Jr. ................ F15C 3/04 251/61.1 |
| 4,852,851 | A | * | 8/1989 | Webster ................ F16K 11/022 137/884 |
| 5,277,556 | A | * | 1/1994 | van Lintel ................ F15C 5/00 417/410.2 |
| 6,158,712 | A | * | 12/2000 | Craig ..................... G01N 30/32 251/61.1 |
| 6,182,941 | B1 | * | 2/2001 | Scheurenbrand ... F16K 99/0051 137/554 |

(Continued)

*Primary Examiner* — Minh Q Le
(74) *Attorney, Agent, or Firm* — Greenberg Traurig, LLP

(57) ABSTRACT

Fluidic devices may include a monolithic gate substrate and a channel substrate coupled to the monolithic gate substrate. The monolithic gate substrate may include a gate chamber and a flexible membrane located adjacent to the gate chamber. The channel substrate may include a source channel and a drain channel that are in fluid communication with the flexible membrane on an opposite side of the flexible membrane from the gate chamber. Various other related devices, systems, and methods are also disclosed.

21 Claims, 15 Drawing Sheets

(56) References Cited

U.S. PATENT DOCUMENTS

| | | | | |
|---|---|---|---|---|
| 8,900,118 | B2* | 12/2014 | Birk | A61F 5/0056 |
| | | | | 137/414 |
| 2003/0083392 | A1* | 5/2003 | Bruza | C08J 9/26 |
| | | | | 257/E21.259 |
| 2006/0076068 | A1* | 4/2006 | Young | B81C 1/00158 |
| | | | | 137/829 |
| 2007/0251592 | A1* | 11/2007 | Christenson | F16K 99/0009 |
| | | | | 137/859 |
| 2008/0035875 | A1* | 2/2008 | Tai | F16K 99/0005 |
| | | | | 29/890.122 |
| 2009/0307906 | A1* | 12/2009 | Pirk | F16K 99/0001 |
| | | | | 29/890.12 |
| 2010/0224255 | A1* | 9/2010 | Mathies | B01L 3/50273 |
| | | | | 137/1 |
| 2011/0162785 | A1* | 7/2011 | Zhou | F16K 99/0057 |
| | | | | 156/196 |
| 2012/0273077 | A1* | 11/2012 | Lang | F16K 99/0036 |
| | | | | 138/40 |
| 2013/0032235 | A1* | 2/2013 | Johnstone | F04B 43/02 |
| | | | | 137/511 |
| 2016/0114591 | A1* | 4/2016 | Kudo | G05D 16/0641 |
| | | | | 347/85 |
| 2016/0369915 | A1* | 12/2016 | Vu | F16K 1/36 |
| 2017/0307091 | A1* | 10/2017 | Branyon | B65D 77/225 |
| 2019/0219194 | A1* | 7/2019 | Lu | F16K 99/0059 |
| 2021/0018102 | A1* | 1/2021 | Stanley | F16K 31/122 |
| 2021/0041280 | A1* | 2/2021 | Wald | F16K 99/0048 |
| 2022/0072545 | A1* | 3/2022 | Keller | B01L 3/502738 |

* cited by examiner

FLUIDIC DEVICES

CROSS REFERENCE TO RELATED APPLICATIONS

This application claims the benefit of U.S. Provisional Patent Application No. 63/276,977, filed 8 Nov. 2021, and of U.S. Provisional Patent Application No. 63/315,636, filed 2 Mar. 2022, the entire disclosure of each of which is incorporated herein by reference.

BRIEF DESCRIPTION OF DRAWINGS

The accompanying drawings illustrate a number of example embodiments and are a part of the specification. Together with the following description, these drawings demonstrate and explain various principles of the present disclosure.

Figure 1:
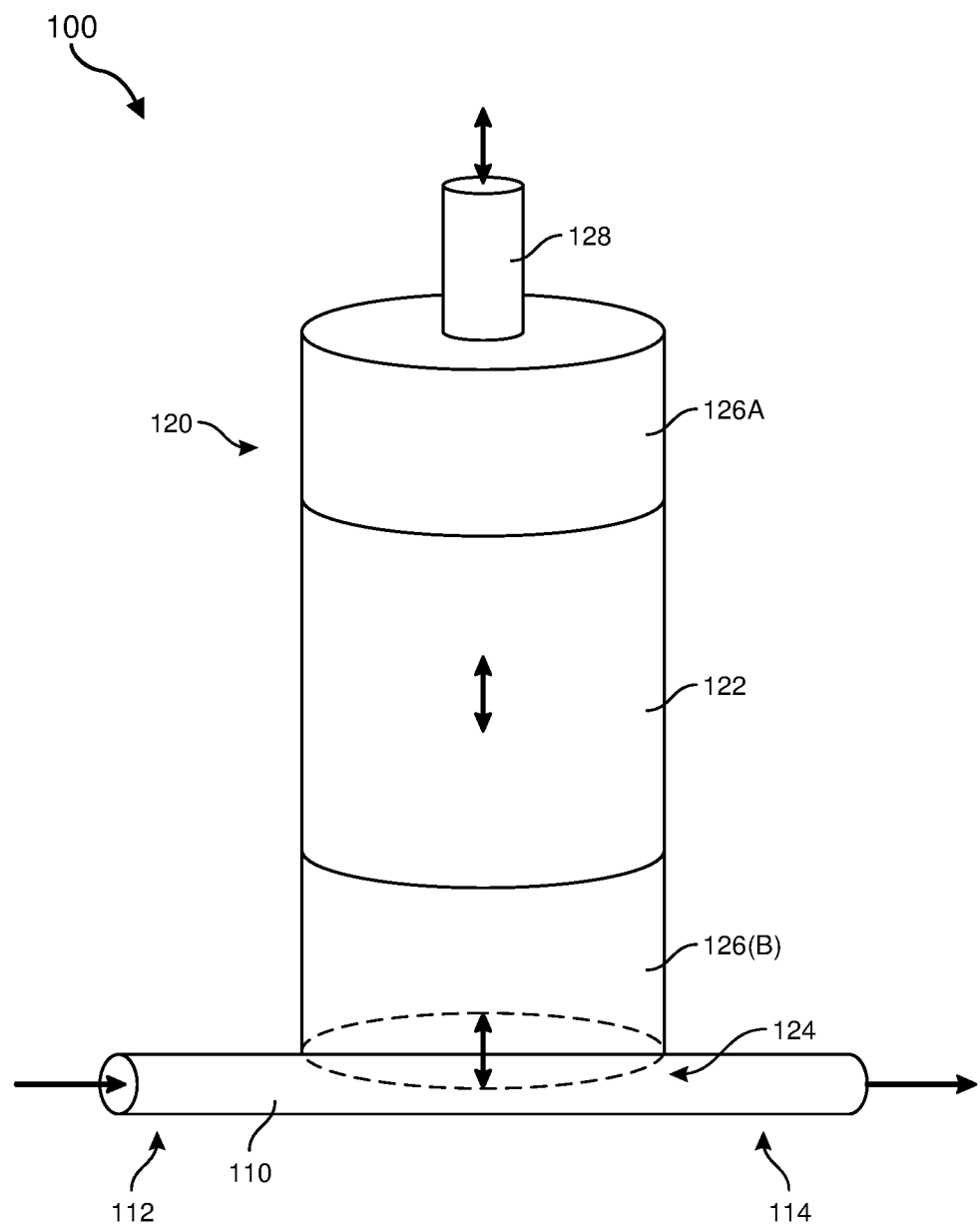
FIG. 1 is an illustration of an example fluidic control system that may be used in connection with embodiments of this disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Microfluidic systems are small mechanical or electromechanical systems that involve the flow of fluids. Microfluidic systems may can be used in many different fields, such as biomedical, chemical, genetic, biochemical, pharmaceutical, haptics, and other fields. A microfluidic valve is a basic component of microfluidic system and may be used for stopping, starting, or otherwise controlling flow of a fluid in a microfluidic system. In some examples, microfluidic valves may be actuated via fluid pressure, with a piezoelectric material, or with a spring-loaded mechanism.

Manufacturing of reusable and reliable valves at the scale of microfluidic systems can be challenging. For example, it can be difficult to form the valves at a small scale (e.g., covering an area of less than 1 cm by 1 cm or even less than 1 mm by 1 mm) in a manner that reliable seals (e.g., at a valve seat, between components of a valve, etc.) may be made. Additionally, moving parts in small mechanisms like microfluidic valves can be fragile and difficult to control without causing damage.

Accordingly, the present disclosure is generally directed to improved and alternative fluidic devices, valves, and systems (e.g., microfluidic devices, valves, and systems). By way of example, embodiments of the present disclosure may include fluidic devices that include a monolithic gate substrate and a channel substrate coupled to the monolithic gate substrate. The monolithic gate substrate may include a unitary, integral piece of material that includes a gate chamber formed therein and a flexible membrane that is part of the monolithic gate substrate. The flexible membrane may be located adjacent to (e.g., forming a boundary of) the gate chamber. The channel substrate may include a source channel in communication with the flexible membrane on an opposite side of the flexible membrane from the gate chamber. The channel substrate may also include a drain channel in fluid communication with the flexible membrane on the opposite side of the flexible membrane from the gate chamber.

Such fluidic devices may, in some examples, facilitate manufacturing, operation, and scaling of microfluidic valves. For example, the flexible membrane of fluidic devices according to embodiments of the present disclosure may act as a piston to seal or unseal a fluidic pathway between the source channel and the drain channel without requiring a separate piston piece to be made. Therefore, construction may be reliable and simple compared to fluidic devices with a separate piston. In addition, surfaces between the monolithic gate substrate and the channel substrate may be polished, potentially improving a seal compared to fluidic devices that may include etched sealing surfaces.

As noted above, the present disclosure may include fluidic systems (e.g., haptic fluidic systems) that involve the control (e.g., stopping, starting, restricting, increasing, etc.) of fluid flow through a fluid channel. The control of fluid flow may be accomplished with a fluidic valve. FIG. 1 shows a schematic diagram of a fluidic valve 100 for controlling flow through a fluid channel 110, according to at least one embodiment of the present disclosure. Fluid from a fluid source (e.g., a pressurized fluid source, a fluid pump, etc.) may flow through the fluid channel 110 from an inlet port 112 to an outlet port 114, which may be operably coupled to, for example, a fluid-driven mechanism, another fluid channel, or a fluid reservoir.

Fluidic valve 100 may include a gate 120 for controlling the fluid flow through fluid channel 110. Gate 120 may include a gate transmission element 122, which may be a movable component that is configured to transmit an input force, pressure, or displacement to a restricting region 124 to restrict or stop flow through the fluid channel 110. Conversely, in some examples, application of a force, pressure, or displacement to gate transmission element 122 may result in opening restricting region 124 to allow or increase flow through the fluid channel 110. The force, pressure, or displacement applied to gate transmission element 122 may be referred to as a gate force, gate pressure, or gate displacement. Gate transmission element 122 may be a flexible element (e.g., an elastomeric membrane, a diaphragm, etc.), a rigid element (e.g., a movable piston, a lever, etc.), or a combination thereof (e.g., a movable piston or a lever coupled to an elastomeric membrane or diaphragm).

As illustrated in FIG. 1, gate 120 of fluidic valve 100 may include one or more gate terminals, such as an input gate terminal 126(A) and an output gate terminal 126(B) (collectively referred to herein as "gate terminals 126") on opposing sides of gate transmission element 122. Gate terminals 126 may be elements for applying a force (e.g., pressure) to gate transmission element 122. By way of example, gate terminals 126 may each be or include a fluid chamber adjacent to gate transmission element 122. Alternatively or additionally, one or more of gate terminals 126 may include a solid component, such as a lever, screw, or piston, that is configured to apply a force to gate transmission element 122.

In some examples, a gate port 128 may be in fluid communication with input gate terminal 126(A) for applying a positive or negative fluid pressure within the input gate terminal 126(A). A control fluid source (e.g., a pressurized fluid source, a fluid pump, etc.) may be in fluid communication with gate port 128 to selectively pressurize and/or depressurize input gate terminal 126(A). In additional embodiments, a force or pressure may be applied at the input gate terminal 126(A) in other ways, such as with a piezoelectric element or an electromechanical actuator, etc.

In the embodiment illustrated in FIG. 1, pressurization of the input gate terminal 126(A) may cause the gate transmission element 122 to be displaced toward restricting region 124, resulting in a corresponding pressurization of output gate terminal 126(B). Pressurization of output gate terminal 126(B) may, in turn, cause restricting region 124 to partially or fully restrict to reduce or stop fluid flow through the fluid channel 110. Depressurization of input gate terminal 126(A) may cause gate transmission element 122 to be displaced away from restricting region 124, resulting in a corresponding depressurization of the output gate terminal 126(B). Depressurization of output gate terminal 126(B) may, in turn, cause restricting region 124 to partially or fully expand to allow or increase fluid flow through fluid channel 110. Thus, gate 120 of fluidic valve 100 may be used to control fluid flow from inlet port 112 to outlet port 114 of fluid channel 110.

Figure 2A:
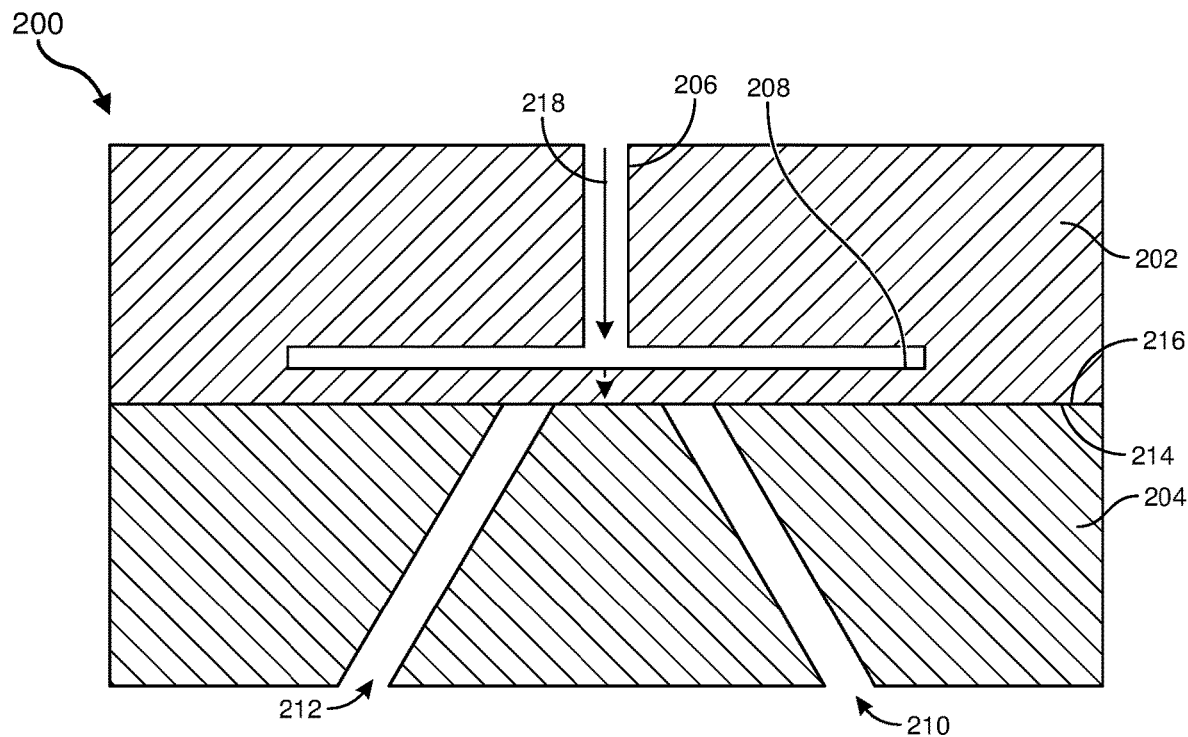
FIGS. 2A and 2B are cross-sectional side views of a fluidic device in respective closed and open states, according to at least one embodiment of the present disclosure.
Figure 2B:
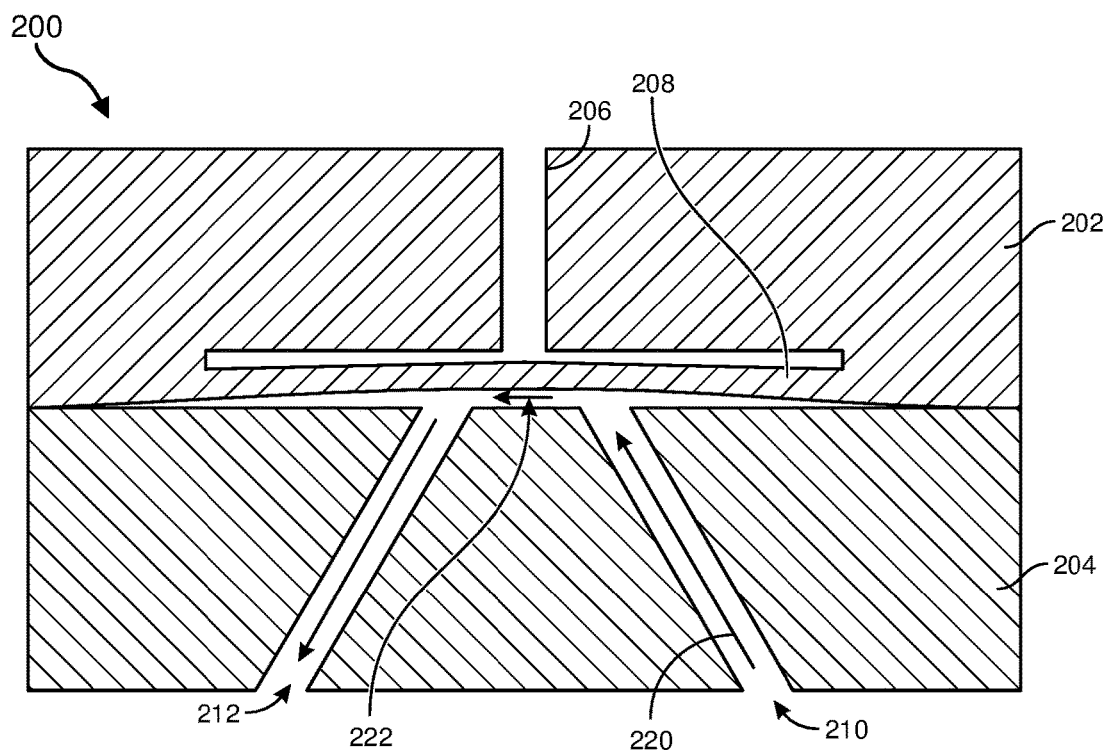

FIGS. 2A and 2B are cross-sectional side views of a fluidic device 200 in respective closed (FIG. 2A) and open (FIG. 2B) states, according to at least one embodiment of the present disclosure. The fluidic device 200 may include a monolithic gate substrate 202 coupled to (e.g., welded to, adhered to, etc.) a channel substrate 204. The monolithic gate substrate 202 may include a gate chamber 206 formed therein and a flexible membrane 208 that is part (e.g., a unitary, integral part) of the monolithic gate substrate 202. The flexible membrane 208 may be located adjacent to (e.g., forming a boundary of) the gate chamber 206.

The channel substrate 204 may include a source channel 210 and a drain channel 212 formed therein. Each of the source channel 210 and the drain channel 212 may be in fluid communication with the flexible membrane 208 on an opposite side of the flexible membrane 208 from the gate chamber 206.

As shown in FIG. 2A, in the closed state the flexible membrane 208 may abut against the channel substrate 204 between the source channel 210 and drain channel 212 to inhibit (e.g., reduce and/or eliminate) fluid from flowing from the source channel 210 to the drain channel 212.

In some embodiments, a first surface 214 of the monolithic gate substrate 202 adjacent to the channel substrate 204 may exhibit a polished finish. Likewise, a second surface 216 of the channel substrate 204 adjacent to the monolithic gate substrate 202 may also exhibit a polished finish. The polished finish may improve a seal between the monolithic gate substrate 202 and channel substrate 204, compared to fluidic devices with an etched sealing surface. This, in turn, may inhibit leakage from the source channel 210 to the drain channel 212 and/or may reduce a power consumption of the fluidic device 200 when maintaining the fluidic device 200 in the closed state.

In some embodiments, to keep the fluidic device 200 in the closed state, a fluidic pressure 218 may be applied to the gate chamber 206 to force the flexible membrane 208 into a closed position against the channel substrate 204. In some embodiments, during operation the source channel 210 may be constantly exposed to a channel pressure. To keep the fluidic device 200 in the closed state, the fluidic pressure 218 applied to the gate chamber 206 may be sufficient to overcome the channel pressure within the source channel 210.

Referring to FIG. 2B, when the fluidic pressure 218 is removed from the gate chamber 206 (e.g., vented to ambient, sufficiently reduced, etc.), the fluidic device 200 may transition to an open state. A channel pressure 220 within the source channel 210 may force the flexible membrane 208 away from the channel substrate 204, opening a fluid pathway 222 between the source channel 210 and the drain channel 212. In this open state, fluid (e.g., air, water, etc.) may flow from the source channel 210 to the drain channel 212.

When it is desired to close the fluidic device 200 and inhibit fluid flow from the source channel 210 to the drain channel 212, the fluidic pressure 218 may again be applied to the gate chamber 206 to overcome the channel pressure 220 within the source channel 210 and to force the flexible membrane 208 back toward and against the channel substrate 204.

In some embodiments, the monolithic gate substrate 202 (including the flexible membrane 208) and the channel substrate 204 may each be formed of a glass material, such as silicon dioxide. The flexible membrane 208 may be sufficiently thin to enable bending as shown in FIGS. 2A and 2B. For example, the flexible membrane 208 may have a thickness of less than 200 μm, such as less than 100 μm, less than 75 μm, or less than 50 μm. A portion of the gate chamber 206 over the flexible membrane 208 may have a width to facilitate the bending of the flexible membrane 208.

For example, a diameter of the flexible membrane 208 may be about 2 mm or less, such as about 1 mm or less, about 500 μm or less, etc.

The features (e.g., gate chamber 206, source channel 210, drain channel 212) of the monolithic gate substrate 202 and channel substrate 204 may be formed by material removal processes, such as photolithography, laser etching, chemical etching, etc.

Figure 3:
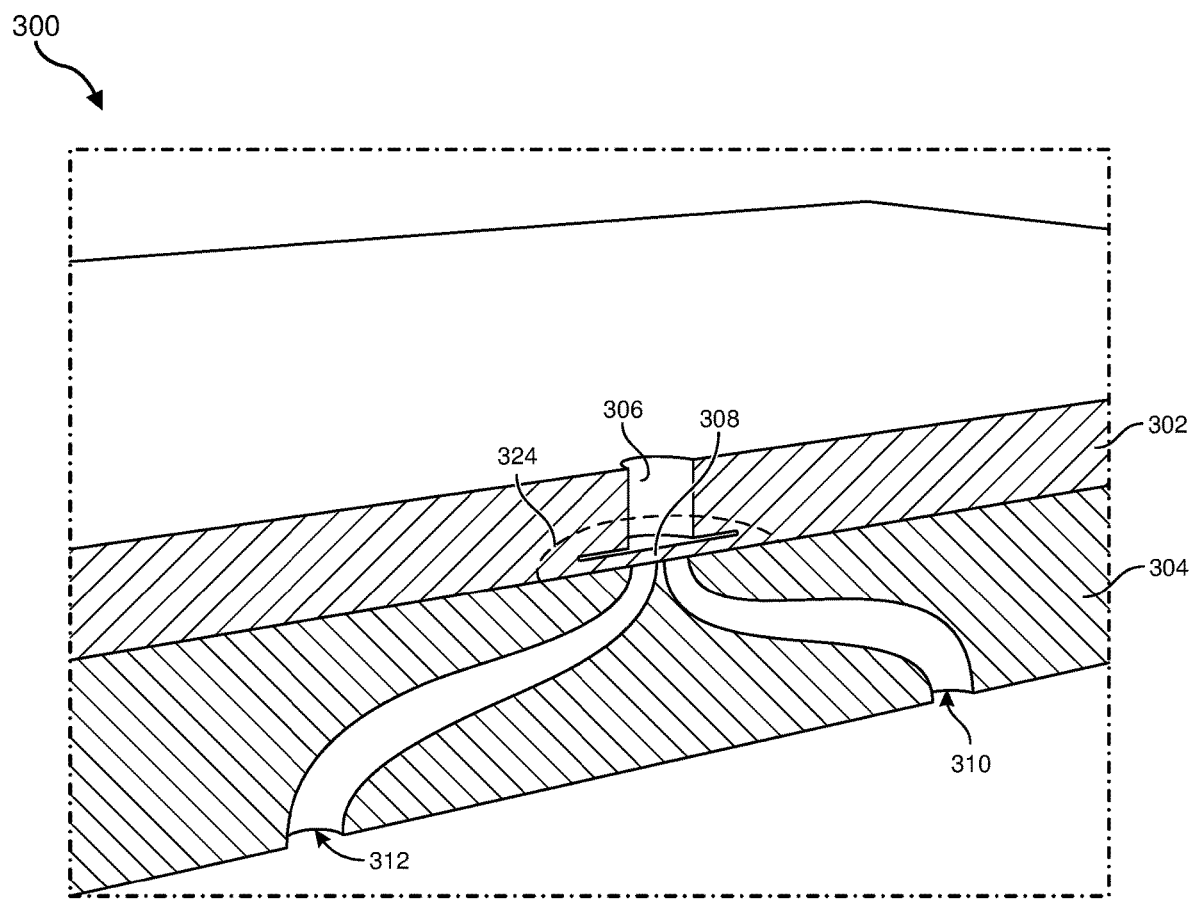
FIG. 3 is a partially transparent cross-sectional perspective view of a fluidic device, according to at least one embodiment of the present disclosure.

FIG. 3 is a partially transparent cross-sectional perspective view of a fluidic device 300, according to at least one embodiment of the present disclosure. In some respects, the fluidic device 300 may be similar to the fluidic device 200 described above. For example, the fluidic device 300 may include a monolithic gate substrate 302 coupled to a channel substrate 304. The monolithic gate substrate 302 may include a gate chamber 306 formed therein. A flexible membrane 308 may be a part of the monolithic gate substrate 302 adjacent to the gate chamber 306. The channel substrate 304 may include a source channel 310 and a drain channel 312, each of which may be in fluid communication with the flexible membrane 308 on an opposite side of the flexible membrane 308 from the gate chamber 306.

As noted above, the monolithic gate substrate 302 may be coupled to the channel substrate 304. For example, a weld and/or an adhesive may secure the monolithic gate substrate 302 to the channel substrate 304. FIG. 3 illustrates a circular weld 324 surrounding the flexible membrane 308. The circular weld 324 may be accomplished by laser welding. The circular weld 324 may form a fluid-tight seal around the flexible membrane 308. Since the flexible membrane 308 is a unitary, integral part of the monolithic gate substrate 302, there may be no fluid pathway from the source channel 310 to the gate chamber 306. Thus, there may be no inadvertent leakage between the source channel 310 and the gate chamber 306.

Figure 4:
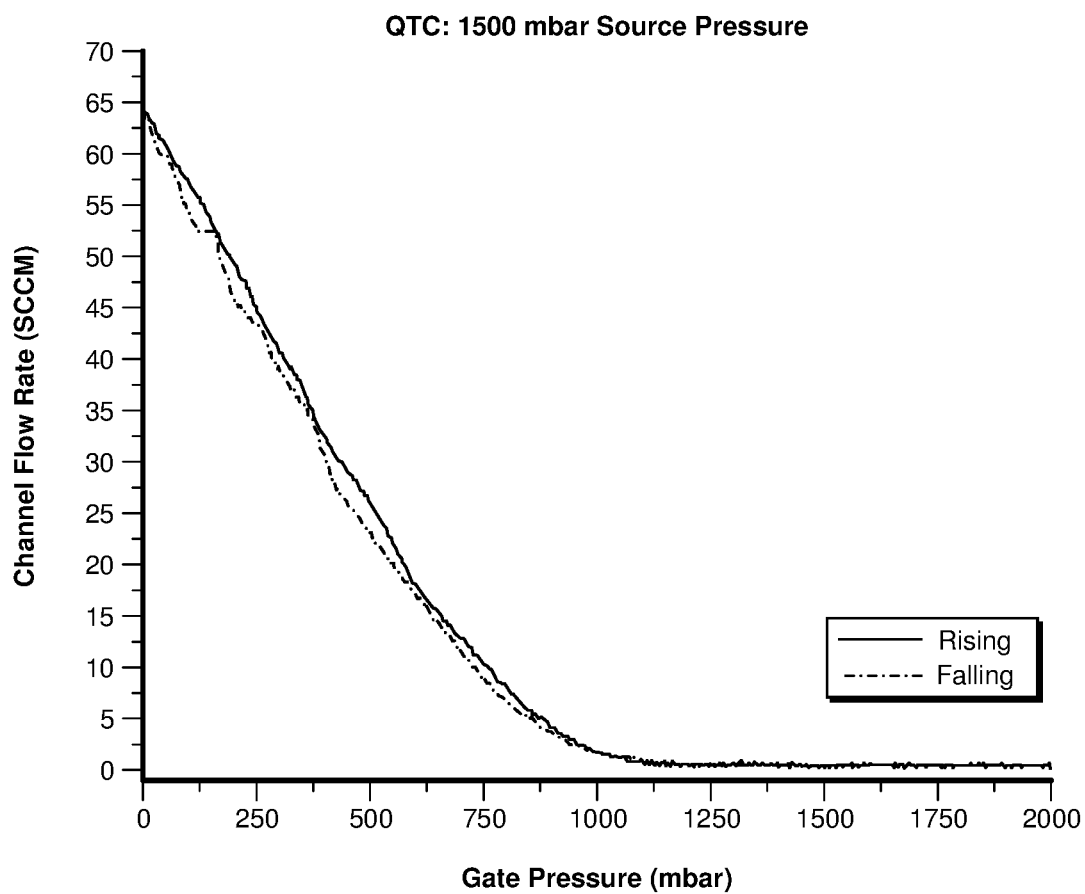
FIG. 4 is a plot illustrating a channel flow rate as a function of gate pressure during operation of a fluidic device according to at least one embodiment of the present disclosure.

FIG. 4 is a plot 400 illustrating a channel flow rate as a function of gate pressure during operation of a fluidic device (e.g., any of the fluidic devices 200, 300 discussed above with reference to FIGS. 2A-3), according to at least one embodiment of the present disclosure. The plot 400 shows a falling channel flow rate in a first curve as the gate pressure increases, and a rising channel flow rate in a second curve as the gate pressure decreases.

To obtain the first curve as the gate pressure increases, a constant fluid pressure of 1500 mbar was applied to the source channel, and the gate pressure was increased from zero mbar (e.g., ambient) to about 2000 mbar, which resulted in the falling channel flow rate. As shown in the plot 400, the channel flow rate falls from about 65 sccm when there is no pressure applied to a gate chamber to zero sccm when the gate pressure reaches between 1000 and 1250 mbar. When there is no flow in the channel, the fluidic device may be in a closed state.

To obtain the second curve as the gate pressure decreases, the constant fluid pressure of 1500 sccm was maintained in the source channel, and the gate pressure was decreased from about 2000 mbar to zero mbar (e.g., ambient), which resulted in the rising channel flow rate. As shown in the plot 400, the channel flow rate rises from zero sccm to about 65 sccm as the gate pressure drops from between 1000 and 1250 mbar to no applied pressure (e.g., ambient). When there is no pressure applied to the gate chamber, the fluidic device may be in an open state.

The plot 400 illustrates that the falling channel flow rate and the rising channel flow rate follow the same or close to the same path. Thus, fluidic devices of the present disclosure appear to have little or no hysteresis, and a predictable flow rate may be induced by applying a corresponding gate pressure. Thus, in some embodiments the fluidic devices of the present disclosure may be used to open a flow channel, close a flow channel, or output a particular desired flow rate between a fully open flow rate and a fully closed flow rate.

Figure 5:
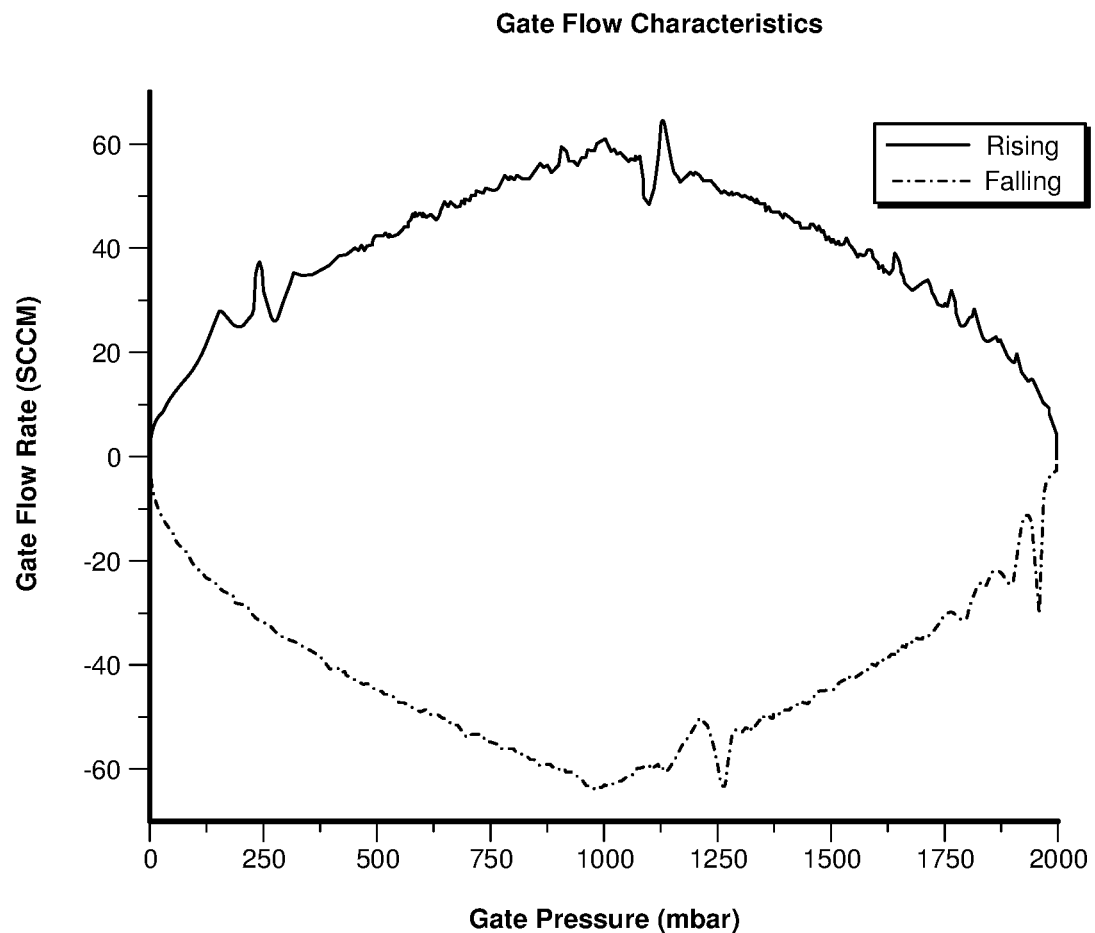
FIG. 5 is a plot illustrating a gate flow rate as a function of gate pressure during operation of a fluidic device according to at least one embodiment of the present disclosure.

FIG. 5 is a plot 500 illustrating a gate flow rate as a function of gate pressure during operation of a fluidic device (e.g., any of the fluidic devices 200, 300 discussed above with reference to FIGS. 2A-3), according to at least one embodiment of the present disclosure. The plot 500 shows a falling gate pressure in a first curve, and a rising gate pressure in a second curve. The plot 500 illustrates flow of fluid introduced into the gate chamber as the gate pressure rises and the flow of fluid out of the gate chamber as the gate pressure falls.

Referring to the first curve with falling gate pressure, since the gate chamber is a reservoir that does not include an outlet (e.g., vent, leak, etc.), the absolute value of the flow rate out of the gate chamber increases to a maximum and then falls to zero when the final applied gate pressure (e.g., 2000 mbar) is reached.

Referring to the second curve with rising gate pressure, the absolute value of the flow rate into the gate chamber increases from zero to a maximum and then falls to back to zero as ambient pressure is reached.

The plot 500 illustrates that there is no flow required to keep the gate pressure at the final applied gate pressure (e.g., 2000 mbar), suggesting that there is no leakage from the gate chamber. In addition, the absolute values of the flow rates into and out of the gate chamber when pressure is applied and released are substantially equivalent, again illustrating that there is little or no hysteresis.

Figure 6:
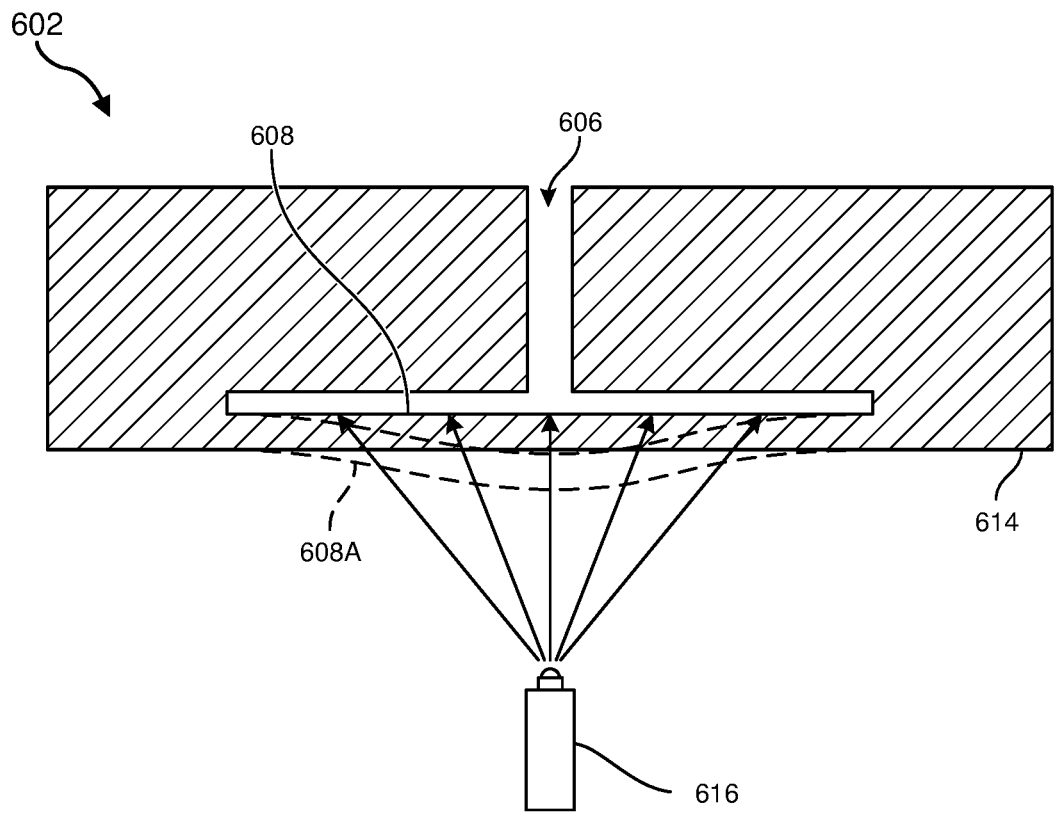
FIG. 6 is a cross-sectional side view of a monolithic gate substrate of a fluidic device, according to at least one embodiment of the present disclosure.

FIG. 6 is a cross-sectional side view of a monolithic gate substrate 602 of a fluidic device, according to at least one embodiment of the present disclosure. In some embodiments, the monolithic gate substrate 602 may be used in place of any of the monolithic gate substrates 202, 302 discussed above. The monolithic gate substrate 602 may be similar to the monolithic gate substrates 202, 302 discussed above. For example, the monolithic gate substrate 602 may include a gate chamber 606 therein and a flexible membrane 608 that is part (e.g., a unitary, integral part) of the monolithic gate substrate 602. The flexible membrane 608 may be located adjacent to (e.g., forming a boundary of) the gate chamber 606. A surface 614 of the monolithic gate substrate 602 that is intended to abut against a corresponding channel substrate may have a polished finish.

The flexible membrane 608 in a closed position is illustrated in FIG. 6 in solid lines. In some examples, a pre-curved flexible membrane 608A, illustrated in FIG. 6 in dashed lines, may be initially formed to bias the pre-curved flexible membrane 608A to the closed position (e.g., against a corresponding channel substrate). For example, the portion of the monolithic gate substrate 602 forming the pre-curved flexible membrane 608A may be heat-treated, chemically treated (e.g., doped), laser treated, or otherwise treated to induce a curvature away from the gate chamber 606. The pre-curved flexible membrane 608A may reduce a gate pressure in the gate chamber 606 required to keep a corresponding fluidic device in a closed state by mechanically biasing the pre-curved flexible membrane 608A to the closed state.

In one example, as shown in FIG. 6, the flexible membrane 608 may be laser treated to result in the pre-curved flexible membrane 608A. For example, a laser source 616 may direct focused laser light on a side of the flexible membrane 608 to be concave in the resulting pre-curved flexible membrane 608A. The focused laser light may induce stress in the exposed side of the flexible membrane 608, which may cause the flexible membrane 608 to become pre-curved in an equilibrium state. After the monolithic gate substrate 602 is assembled with a corresponding channel substrate, the pre-curved flexible membrane 608A may apply a force against the channel substrate without any fluid pressure being applied in the gate chamber 606. This application of force from the pre-curved flexible membrane 608A may enable an operating pressure in the gate chamber 606 to be less than a pressure in the channel, which in turn may enable multiple fluidic devices to be assembled in series (e.g., with a drain side of a channel of one fluidic device in fluid communication with a gate chamber of another fluidic device).

Figure 7:
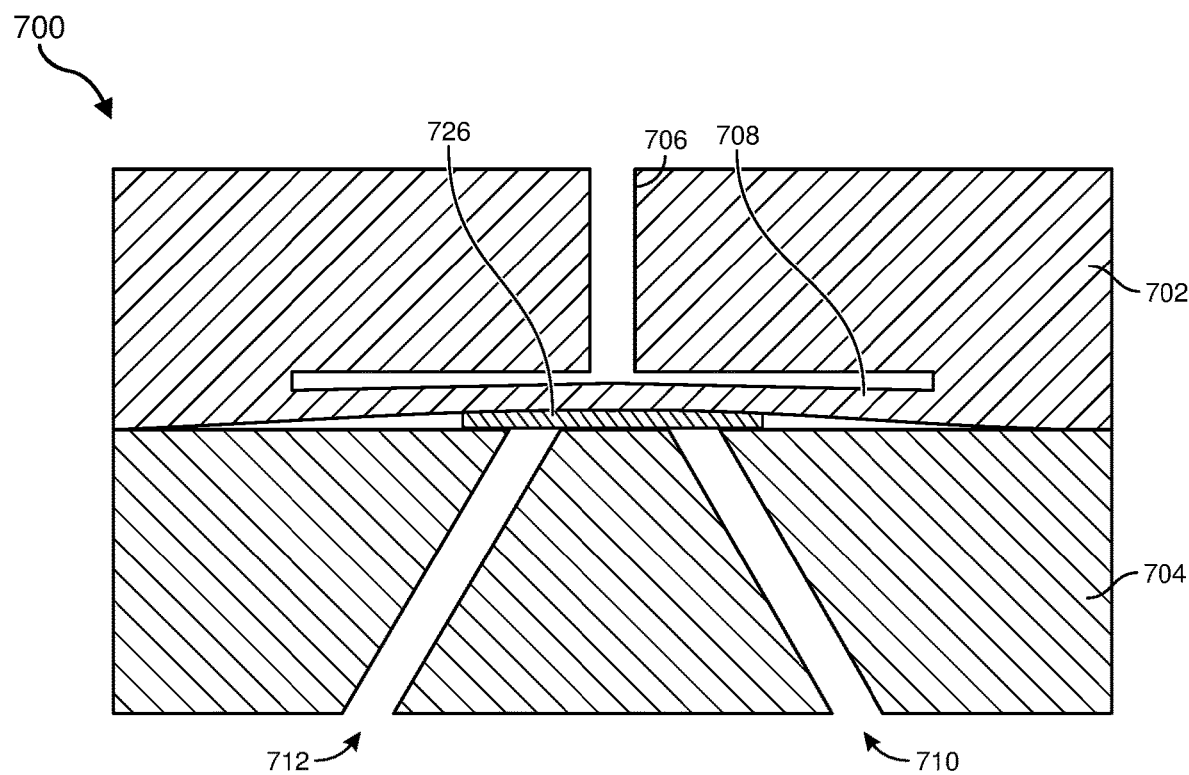
FIG. 7 is a cross-sectional side view of a fluidic device, according to at least one additional embodiment of the present disclosure.

FIG. 7 is a cross-sectional side view of a fluidic device 700, according to at least one additional embodiment of the present disclosure. In some respects, the fluidic device 700 may be similar to the fluidic devices 200, 300 discussed above. For example, the fluidic device 700 may include a monolithic gate substrate 702 coupled to a channel substrate 704. The monolithic gate substrate 702 may include a gate chamber 706 formed therein. A flexible membrane 708 may be a part (e.g., a unitary, integral part) of the monolithic gate substrate 702. The flexible membrane 708 may be located adjacent to (e.g., forming a boundary of) the gate chamber 706. The channel substrate 704 may include a source channel 710 and a drain channel 712 formed therein. Each of the source channel 710 and the drain channel 712 may be in fluid communication with the flexible membrane 708 on an opposite side of the flexible membrane 708 from the gate chamber 706.

As illustrated in FIG. 7, the fluidic device 700 may also include a standoff material 726 coupled to a surface of the flexible membrane 708 opposite the gate chamber 706. The standoff material 726 may cover an opening of the source channel 710 and the drain channel 712 at an interface between the monolithic gate substrate 702 and the channel substrate 704. Thus, the standoff material 726 may form a seal over the source channel 710 and/or drain channel 712 when the fluidic device 700 is in a closed state (e.g., when the gate chamber 706 is pressurized). In the closed state, the flexible membrane 708 may be curved toward the gate chamber 706 due to the position of the standoff material 726. This curvature may bias the flexible membrane 708 and standoff material 726 toward the channel substrate 704 even when no pressure is applied. Thus, the standoff material 726 may result in an improved seal over the source channel 710 and/or drain channel 712 in the closed state. In addition, the standoff material 726 may reduce a level of applied pressure in the gate chamber 706 that may be required to completely close a fluid pathway between the source channel 710 and the drain channel 712 due to the induced bias.

The standoff material 726 may be formed of any material that may be selectively applied to the flexible membrane 708 with a controlled thickness. By way of example and not limitation, the standoff material 726 may include a polymer material (e.g., a photoresist material, a polyimide material, etc.), a metal material (e.g., copper, gold, etc.), an oxide material (e.g., a metal oxide material, a silicon oxide material, etc.), a nitride material (e.g., a silicon nitride material, etc.), or the like. A thickness of the standoff material 726 may be selected to induce the bias described above, while maintaining an appropriate seal between the monolithic gate substrate 702 and the channel substrate 704. By way of example and not limitation, the thickness of the standoff material 726 may be between about 20 µm and about 100 µm, such as about 40 µm, about 50 µm, or about 70 µm.

The example fluidic devices 200, 300, 700 described above operate in a closed state when a pressure applied to a gate chamber is increased to a sufficient level. However, fluidic devices of the present application may also be configured to operate in a closed state when no pressure is applied to the gate chamber (e.g., when the gate chamber is at ambient pressure) and to open when a sufficient pressure is applied to the gate chamber.

Figure 8:
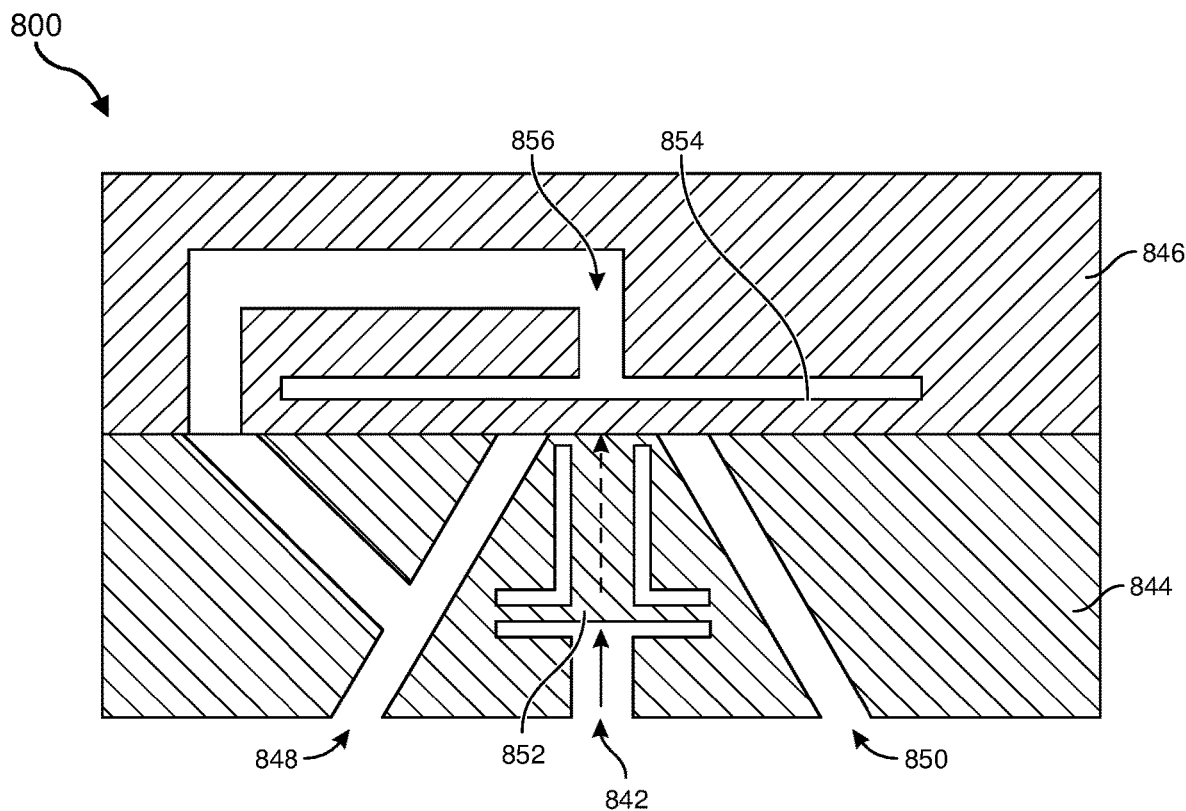
FIG. 8 is a cross-sectional side view of a fluidic device, according to at least one other embodiment of the present disclosure.

For example, FIG. 8 is a cross-sectional side view of a fluidic device 800 that may be in a closed state with no applied gate pressure and in an open state when a sufficient pressure is applied to a gate chamber 842, according to at least one other embodiment of the present disclosure. The fluidic device 800 may include a channel and gate substrate 844 coupled to a sealing substrate 846. The channel and gate substrate 844 may include a source channel 848 and a drain channel 850 formed therein. The channel and gate substrate 844 may also include the gate chamber 842 and a control plunger 852. The control plunger 852 may be part (e.g., an integral, unitary part) of the channel and gate substrate 844.

The sealing substrate 846 may include a flexible membrane 854 that may be part (e.g., an integral, unitary part) of the sealing substrate 846. The sealing substrate 846 may also include a sealing pressure chamber 856 adjacent to the flexible membrane 854 for controlling a position of the flexible membrane 854 between a closed position (as shown in FIG. 8) and an open position. The sealing pressure chamber 856 may be in fluid communication with the source channel 848 and the flexible membrane 854 may have a surface area on the side of the sealing pressure chamber 856 greater than a cross-sectional area of the source channel 848 at the flexible membrane 854. Thus, the flexible membrane 854 may be biased to the closed position due to a force differential across the flexible membrane 854 based on the difference in surface areas exposed to the pressure of the source channel 848.

When in the closed position, the flexible membrane 854 may be positioned to cover the source channel 848 and/or drain channel 850 to inhibit flow between the source channel 848 and the drain channel 850. Due to fluid pressure from the source channel 848, the flexible membrane 854 may be in the closed position when the gate chamber 842 is depressurized (e.g., at ambient temperature). When a sufficient pressure is applied to the gate chamber 842 to flex the control plunger 852 and to overcome a sealing force of the flexible membrane 854 from the pressure in the source channel 848, the flexible membrane 854 may be moved by the control plunger 852 from the closed position toward the open position to allow fluid to flow from the source channel 848 to the drain channel 850. To reach the open position, the combined force from the fluid in the source channel 848 and from the control plunger 852 on a sealing side (e.g., the lower side from the perspective of FIG. 8) of the flexible membrane 854 may overcome the force from the source channel 848 on an opposite side (e.g., in the sealing pressure chamber 856, the upper side from the perspective of FIG. 8) of the flexible membrane 854. To return the flexible membrane 854 to the closed position, pressure within the gate chamber 842 may be removed (e.g., vented to ambient), at which point a force against the flexible membrane 854 from the pressure within the sealing pressure chamber 856 may overcome an opposing force against the flexible membrane 854 from the source channel 848.

Figure 9A:
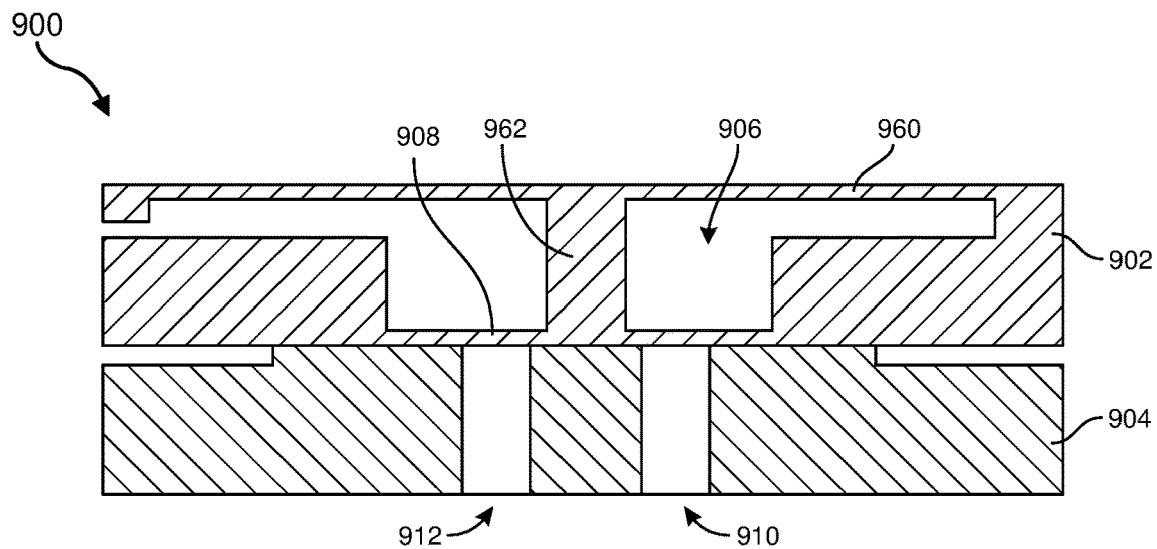
FIGS. 9A-9C illustrate a cross-sectional side view of a fluidic device in three respective operational states, according to at least one further embodiment of the present disclosure.
Figure 9B:
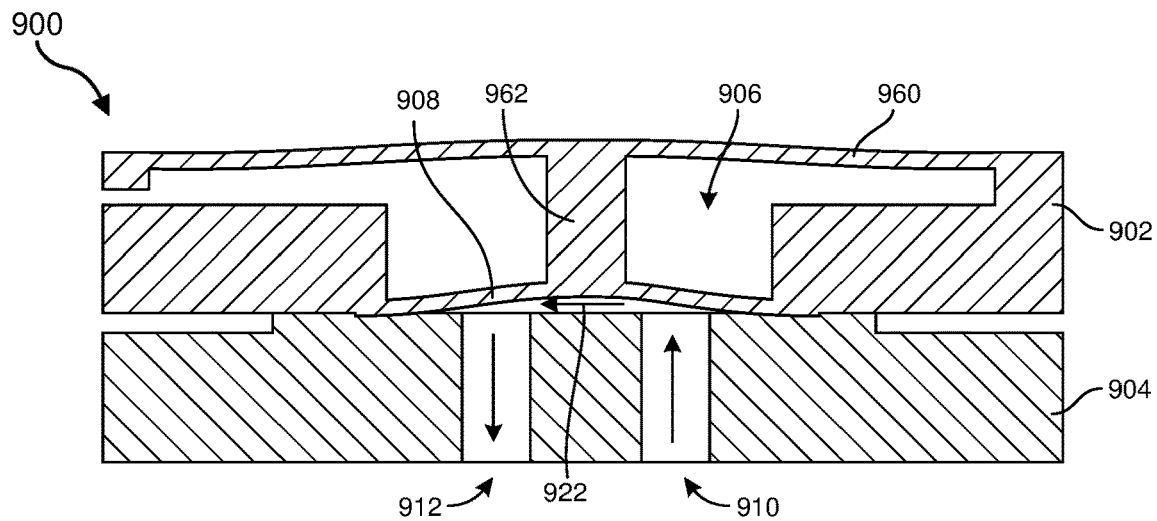
Figure 9C:
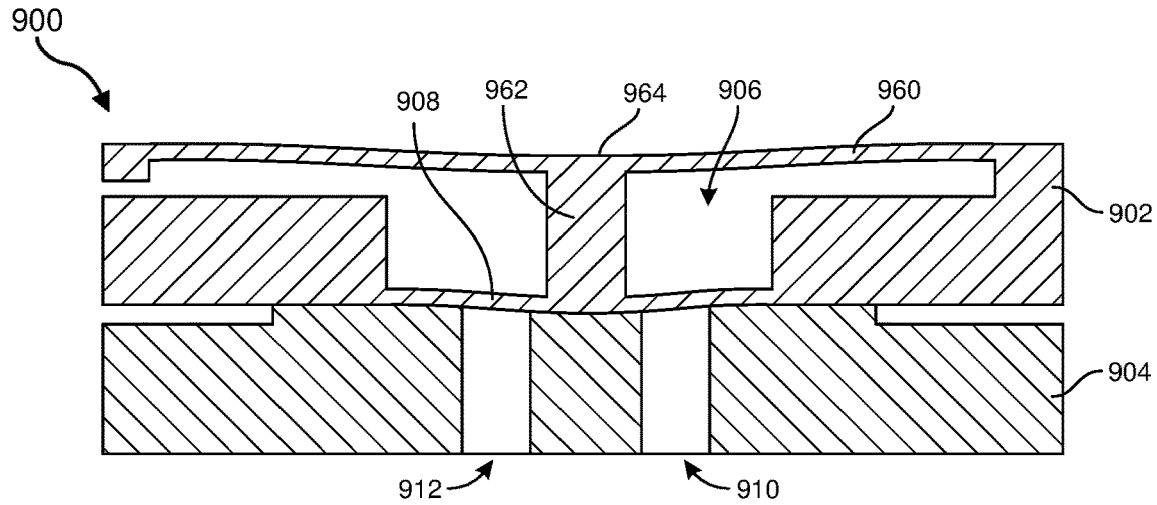

FIGS. 9A-9C illustrate a cross-sectional side view of a fluidic device 900 in three respective operational states, according to at least one further embodiment of the present disclosure. FIG. 9A illustrates the fluidic device 900 in a neutral state (e.g., without application of fluid pressure or fluid flow). FIG. 9B illustrates the fluidic device 900 in an open state. FIG. 9C illustrates the fluidic device 900 in a closed state.

In some respects, the fluidic device 900 may be similar to the fluidic devices 200, 300, 700, 800 described above. For example, the fluidic device 900 may include a monolithic gate substrate 902 coupled to a channel substrate 904. The monolithic gate substrate 902 may include a gate chamber 906 formed therein. A flexible membrane 908 may be a part of the monolithic gate substrate 902 adjacent to the gate chamber 906. The flexible membrane 908 may be located adjacent to (e.g., forming a boundary of) the gate chamber 906.

The channel substrate 904 may include a source channel 910 and a drain channel 912 formed therein, each of which may be in fluid communication with the flexible membrane 908 on an opposite side of the flexible membrane 908 from the gate chamber 906.

The monolithic gate substrate 902 may be coupled to the channel substrate 904. For example, a weld and/or an adhesive may secure the monolithic gate substrate 902 to the channel substrate 904.

In addition to the gate chamber 906 and the flexible membrane 908, the monolithic gate substrate 902 may also include an enlarged gate membrane 960 on an opposite side of the gate chamber 906. The enlarged gate membrane 960 may have a surface area within the gate chamber 906 that is larger than a surface area of the flexible membrane 908. A shaft 962 may extend through the gate chamber 906 between the flexible membrane 908 and the enlarged gate membrane 960. The shaft 962 may form a link (e.g., a rigid link) between the enlarged gate membrane 960 and the flexible membrane 908. The enlarged gate membrane 960 and the shaft 962 may each be part (e.g., an integral, unitary part) of the gate substrate 902.

FIG. 9B illustrates the fluidic device 900 in an open state that allows fluid to flow from the source 910 to the drain 912. In some examples, the open state may result from an internal fluid pressure being applied within the gate chamber 906. When the internal fluid pressure is applied to the gate chamber 906, an overall upward force applied to the enlarged gate membrane 960 will be greater than a downward force applied to the flexible membrane 908. This force differential is due to the difference in surface areas between the enlarged gate membrane 960 and the flexible membrane 908. Since the enlarged gate membrane 960 is linked to the flexible membrane 908 via the shaft 962, the force differential may cause the enlarged gate membrane 960 and the flexible membrane 908 to move away from the gate substrate 904 to open a fluid pathway 922 between the source 910 and the drain 912.

In additional examples, the open state shown in FIG. 9B may result from no pressure being applied to the gate chamber 906. In this case, fluid pressure applied through the source 910 may be sufficient to move the flexible membrane 908 away from the channel substrate 904 and to open the fluid pathway 922 between the source 910 and the drain 912.

FIG. 9C illustrates the fluidic device 900 in a closed state, with the flexible membrane 908 being forced toward the channel substrate 904 to restrict (e.g., reduce or close) the fluid pathway 922 (FIG. 9B). In some examples, the closed state may result from a fluid pressure being applied to an external surface 964 (e.g., the upper surface from the perspective of FIG. 9C) of the enlarged gate membrane 960 to force the enlarged gate membrane 960 toward the channel substrate 904. The enlarged gate membrane 960 may, in turn, apply a force to the flexible membrane 908 through the shaft 962 to force the flexible membrane 908 toward and against the channel substrate 904.

In additional examples, the closed state of the fluidic device 900 may result from a pre-stressed flexible membrane 908 and/or a pre-stressed enlarged gate membrane 960, as explained above with reference to FIG. 6.

In yet further examples, the closed state of the fluidic device 900 may result from a standoff material applied to the flexible membrane 908, as explained above with reference to FIG. 7.

In the cases of the flexible membrane 908 being pre-stressed toward the channel substrate 904 or the standoff material being applied to the flexible membrane 908, a fluid pressure within the source 910 may be insufficient to force the flexible membrane 908 away from the channel substrate 904 to open a pathway between the source 910 and the drain 912. In such cases, application of a fluid pressure within the gate chamber 906 may be used to apply a sufficient force to open the pathway between the source 910 and the drain 912. Thus, the fluidic device 900 may be configured to operate between closed and open states with a constant fluid pressure applied at the source 910.

The configuration of the fluidic device 900, including the enlarged gate membrane 960 and shaft 962, may provide a gain that facilitates the use of the fluidic device 900 in series and/or parallel with other similar fluidic devices 900, such as for a fluidic logic system. For example, a gate pressure required to shift the flexible membrane 908 between the closed and open states may be less than or the same as a pressure of fluid exiting the fluidic device 900 through the drain 912. Thus, the drain 912 of one fluidic device 900 may be used to supply a gate pressure for operating another fluidic device 900 without a loss of pressure across multiple fluidic devices 900.

Figure 10:
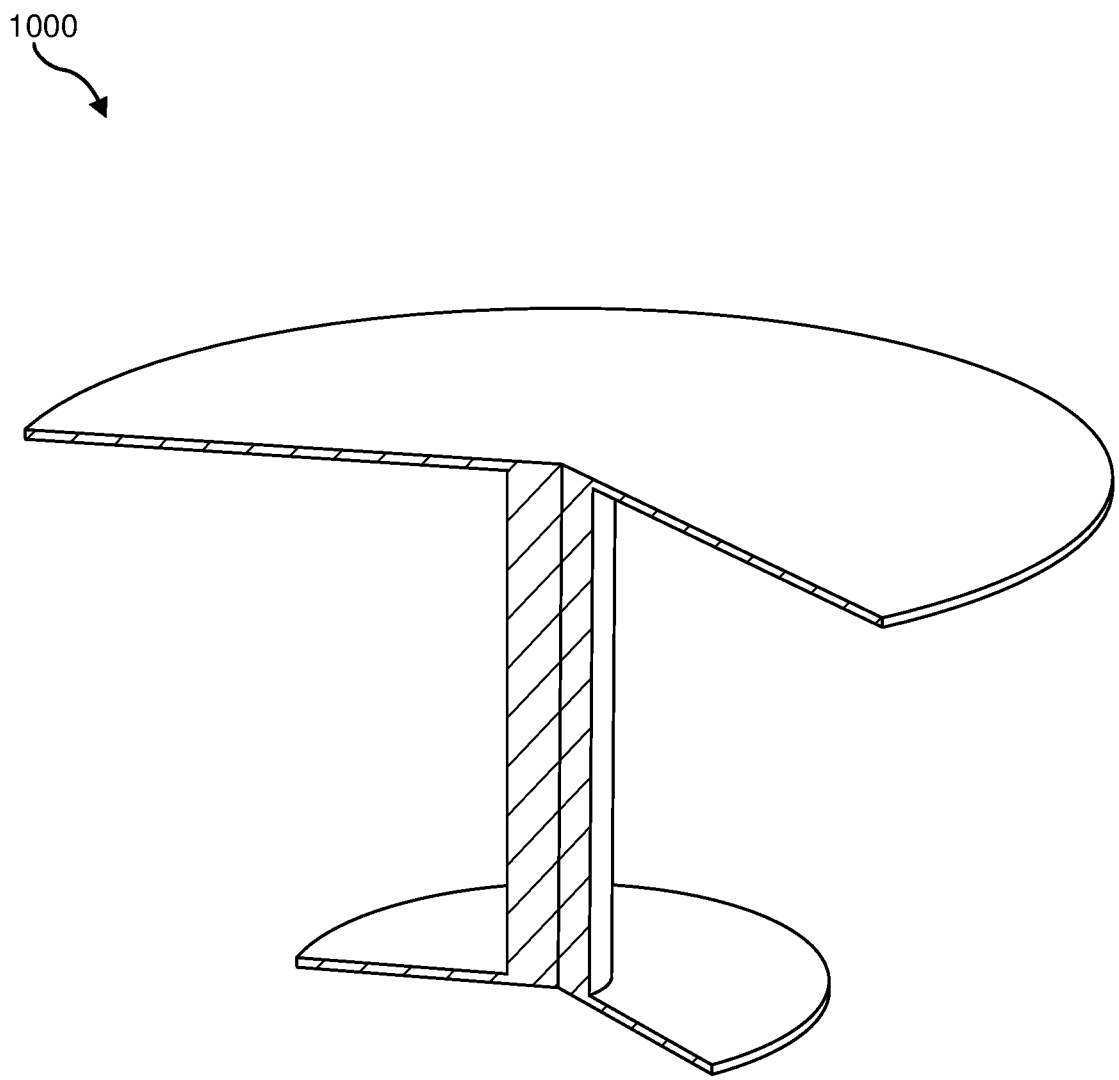
FIG. 10 is a cross-sectional perspective view of a gate structure of a fluidic device, according to at least one embodiment of the present disclosure.

FIG. 10 is a cross-sectional perspective view of a gate structure 1000 of a fluidic device, according to at least one embodiment of the present disclosure. By way of example, the gate structure 1000 may be used in or part of the fluidic device 900. The gate structure 100 may include the flexible membrane 908, enlarged gate membrane 960, and shaft 962. As explained above and as illustrated in FIG. 10, the flexible membrane 908, enlarged gate membrane 960, and shaft 962 may be parts of a unitary, integral body of material. The enlarged gate membrane 960 may have a larger internal surface area than the flexible membrane 908, and the shaft 962 may link the enlarged gate membrane 960 to the flexible membrane 908.

Accordingly, the present disclosure includes various embodiments of fluidic devices, which may be implemented at a microfluidic scale. The fluidic devices of the present disclosure may reduce a number of moving parts and improve simplicity of fabrication and assembly compared to devices with separate piston elements. The fluidic device may also be scalable for arrays of fluidic devices, such as for fluidic logic and/or control of haptic devices, without adding much volume per additional fluidic device in the array. In addition, leak-free and reliable operation may be maintained by the fluidic devices of the present disclosure.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
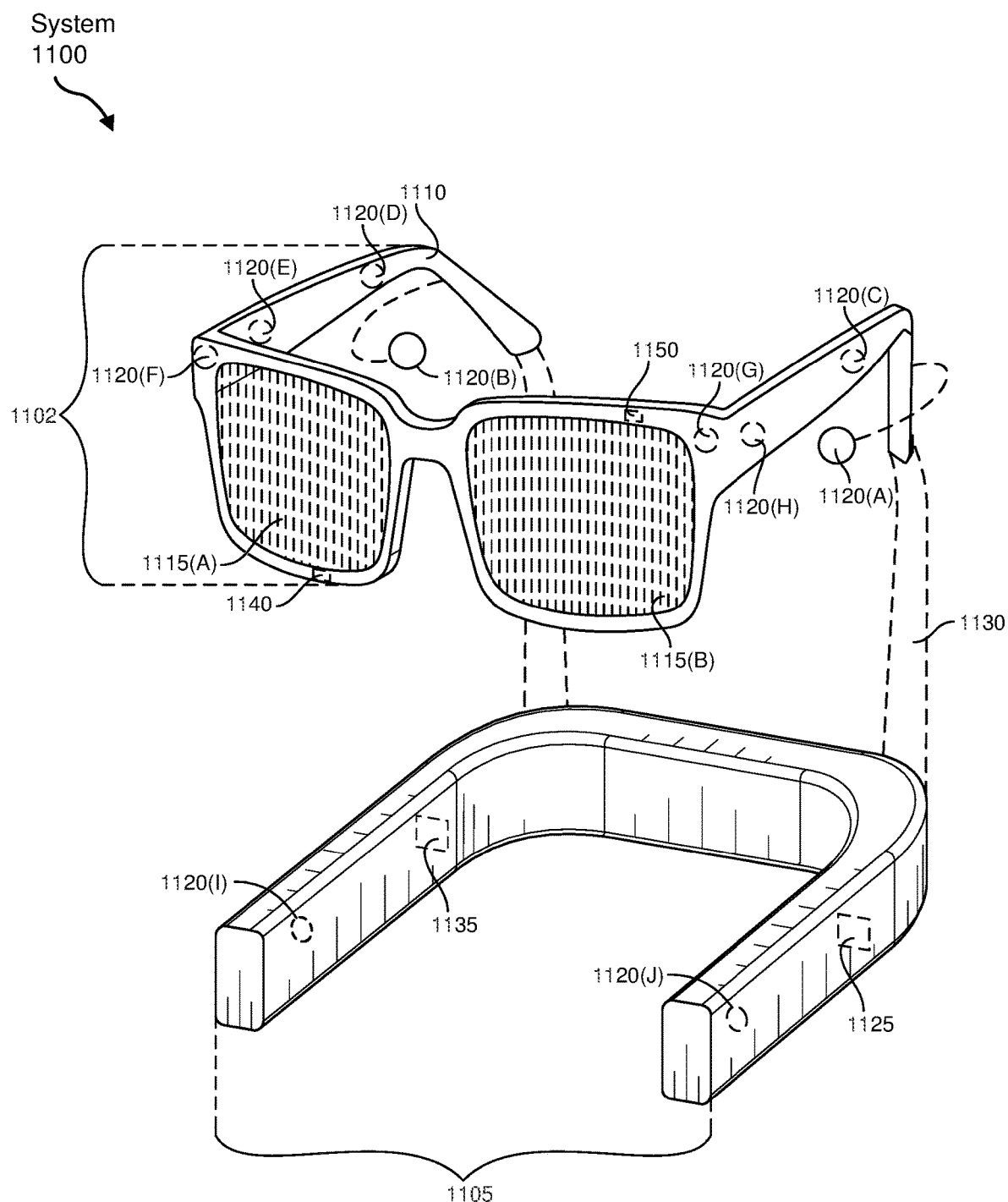
FIG. 11 is an illustration of example augmented-reality glasses that may be used in connection with embodiments of this disclosure.

Turning to FIG. 11, the augmented-reality system 1100 may include an eyewear device 1102 with a frame 1110 configured to hold a left display device 1115(A) and a right display device 1115(B) in front of a user's eyes. The display devices 1115(A) and 1115(B) may act together or independently to present an image or series of images to a user. While the augmented-reality system 1100 includes two displays, embodiments of this disclosure may be implemented in augmented-reality systems with a single NED or more than two NEDs.

In some embodiments, the augmented-reality system 1100 may include one or more sensors, such as sensor 1140. The sensor 1140 may generate measurement signals in response to motion of the augmented-reality system 1100 and may be located on substantially any portion of the frame 1110. The sensor 1140 may represent one or more of a variety of different sensing mechanisms, such as a position sensor, an inertial measurement unit (IMU), a depth camera assembly, a structured light emitter and/or detector, or any combination thereof. In some embodiments, the augmented-reality system 1100 may or may not include the sensor 1140 or may include more than one sensor. In embodiments in which the sensor 1140 includes an IMU, the IMU may generate calibration data based on measurement signals from the sensor 1140. Examples of the sensor 1140 may include, without limitation, accelerometers, gyroscopes, magnetometers, other suitable types of sensors that detect motion, sensors used for error correction of the IMU, or some combination thereof.

In some examples, the augmented-reality system 1100 may also include a microphone array with a plurality of acoustic transducers 1120(A)-1120(J), referred to collectively as acoustic transducers 1120. The acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on the frame 1110, and/or acoustic transducers 1120(I) and 1120(J), which may be positioned on a corresponding neckband 1105.

In some embodiments, one or more of the acoustic transducers 1120(A)-(J) may be used as output transducers (e.g., speakers). For example, the acoustic transducers 1120(A) and/or 1120(B) may be earbuds or any other suitable type of headphone or speaker.

The configuration of the acoustic transducers 1120 of the microphone array may vary. While the augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on the frame 1110, an orientation associated with each acoustic transducer 1120, or some combination thereof.

The acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to the acoustic transducers 1120 inside the ear canal. Having an acoustic transducer 1120 positioned next to an ear canal of a user may enable the microphone array to collect information on how sounds arrive at the ear canal. By positioning at least two of the acoustic transducers 1120 on either side of a user's head (e.g., as binaural microphones), the augmented-reality device 1100 may simulate binaural hearing and capture a 3D stereo sound field around about a user's head. In some embodiments, the acoustic transducers 1120(A) and 1120(B) may be connected to the augmented-reality system 1100 via a wired connection 1130, and in other embodiments the acoustic transducers 1120(A) and 1120(B) may be connected to the augmented-reality system 1100 via a wireless connection (e.g., a BLUETOOTH connection). In still other embodiments, the acoustic transducers 1120(A) and 1120(B) may not be used at all in conjunction with the augmented-reality system 1100.

The acoustic transducers 1120 on the frame 1110 may be positioned in a variety of different ways, including along the length of the temples, across the bridge, above or below display devices 1115(A) and 1115(B), or some combination thereof. The acoustic transducers 1120 may also be oriented such that the microphone array is able to detect sounds in a wide range of directions surrounding the user wearing the augmented-reality system 1100. In some embodiments, an optimization process may be performed during manufacturing of the augmented-reality system 1100 to determine relative positioning of each acoustic transducer 1120 in the microphone array.

In some examples, the augmented-reality system 1100 may include or be connected to an external device (e.g., a paired device), such as the neckband 1105. The neckband 1105 generally represents any type or form of paired device.

Thus, the following discussion of the neckband 1105 may also apply to various other paired devices, such as charging cases, smart watches, smart phones, wrist bands, other wearable devices, hand-held controllers, tablet computers, laptop computers, other external compute devices, etc.

As shown, the neckband 1105 may be coupled to the eyewear device 1102 via one or more connectors. The connectors may be wired or wireless and may include electrical and/or non-electrical (e.g., structural) components. In some cases, the eyewear device 1102 and the neckband 1105 may operate independently without any wired or wireless connection between them. While FIG. 11 illustrates the components of the eyewear device 1102 and neckband 1105 in example locations on the eyewear device 1102 and neckband 1105, the components may be located elsewhere and/or distributed differently on the eyewear device 1102 and/or neckband 1105. In some embodiments, the components of the eyewear device 1102 and neckband 1105 may be located on one or more additional peripheral devices paired with the eyewear device 1102, neckband 1105, or some combination thereof.

Pairing external devices, such as the neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of the augmented-reality system 1100 may be provided by a paired device or shared between a paired device and an eyewear device, thus reducing the weight, heat profile, and form factor of the eyewear device overall while still retaining desired functionality. For example, the neckband 1105 may allow components that would otherwise be included on an eyewear device to be included in the neckband 1105 since users may tolerate a heavier weight load on their shoulders than they would tolerate on their heads. The neckband 1105 may also have a larger surface area over which to diffuse and disperse heat to the ambient environment. Thus, the neckband 1105 may allow for greater battery and computation capacity than might otherwise have been possible on a stand-alone eyewear device. Since weight carried in the neckband 1105 may be less invasive to a user than weight carried in the eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

The neckband 1105 may be communicatively coupled with the eyewear device 1102 and/or to other devices. These other devices may provide certain functions (e.g., tracking, localizing, depth mapping, processing, storage, etc.) to the augmented-reality system 1100. In the embodiment of FIG. 11, the neckband 1105 may include two acoustic transducers (e.g., 1120(1) and 1120(J)) that are part of the microphone array (or potentially form their own microphone subarray). The neckband 1105 may also include a controller 1125 and a power source 1135.

The acoustic transducers 1120(1) and 1120(J) of the neckband 1105 may be configured to detect sound and convert the detected sound into an electronic format (analog or digital). In the embodiment of FIG. 11, the acoustic transducers 1120(1) and 1120(J) may be positioned on the neckband 1105, thereby increasing the distance between the neckband acoustic transducers 1120(1) and 1120(J) and other acoustic transducers 1120 positioned on the eyewear device 1102. In some cases, increasing the distance between the acoustic transducers 1120 of the microphone array may improve the accuracy of beamforming performed via the microphone array. For example, if a sound is detected by the acoustic transducers 1120(C) and 1120(D) and the distance between the acoustic transducers 1120(C) and 1120(D) is greater than, e.g., the distance between the acoustic transducers 1120(D) and 1120(E), the determined source location of the detected sound may be more accurate than if the sound had been detected by the acoustic transducers 1120(D) and 1120(E).

The controller 1125 of the neckband 1105 may process information generated by the sensors on the neckband 1105 and/or augmented-reality system 1100. For example, the controller 1125 may process information from the microphone array that describes sounds detected by the microphone array. For each detected sound, the controller 1125 may perform a direction-of-arrival (DOA) estimation to estimate a direction from which the detected sound arrived at the microphone array. As the microphone array detects sounds, the controller 1125 may populate an audio data set with the information. In embodiments in which the augmented-reality system 1100 includes an inertial measurement unit, the controller 1125 may compute all inertial and spatial calculations from the IMU located on the eyewear device 1102. A connector may convey information between the augmented-reality system 1100 and the neckband 1105 and between the augmented-reality system 1100 and the controller 1125. The information may be in the form of optical data, electrical data, wireless data, or any other transmittable data form. Moving the processing of information generated by the augmented-reality system 1100 to the neckband 1105 may reduce weight and heat in the eyewear device 1102, making it more comfortable to the user.

The power source 1135 in the neckband 1105 may provide power to the eyewear device 1102 and/or to the neckband 1105. The power source 1135 may include, without limitation, lithium ion batteries, lithium-polymer batteries, primary lithium batteries, alkaline batteries, or any other form of power storage. In some cases, the power source 1135 may be a wired power source. Including the power source 1135 on the neckband 1105 instead of on the eyewear device 1102 may help better distribute the weight and heat generated by the power source 1135.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. The virtual-reality system 1200 may include a front rigid body 1202 and a band 1204 shaped to fit around a user's head. The virtual-reality system 1200 may also include output audio transducers 1206(A) and 1206(B). Furthermore, while not shown in FIG. 12, the front rigid body 1202 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in the augmented-reality system 1100 and/or the virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in the augmented-reality system 1100 and/or the virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, the augmented-reality system 1100 and/or the virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, the artificial-reality systems 1100 and 1200 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 13:
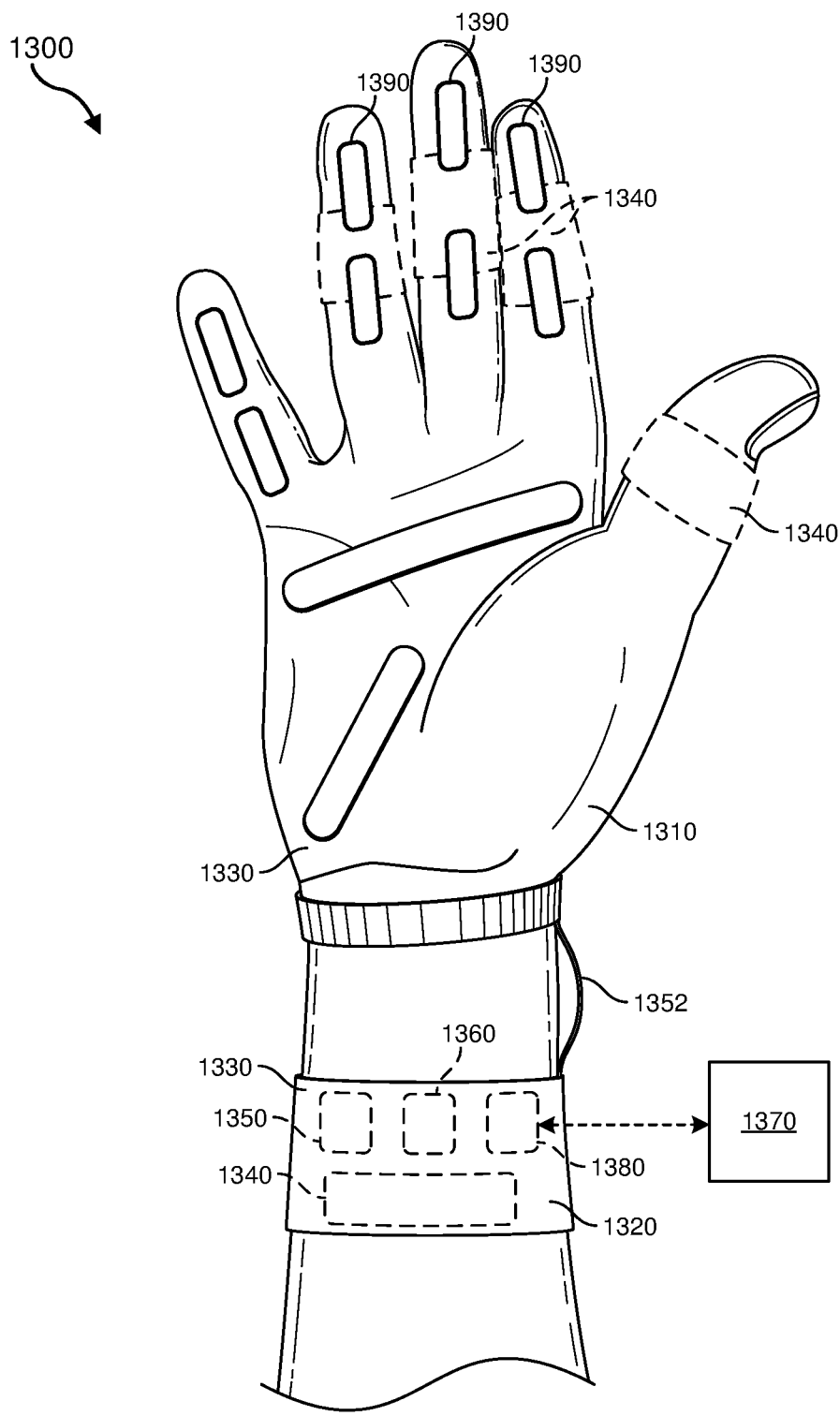
FIG. 13 is an illustration of example haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 13 illustrates a vibrotactile system 1300 in the form of a wearable glove (haptic device 1310) and wristband (haptic device 1320). The haptic device 1310 and the haptic device 1320 are shown as examples of wearable devices that include a flexible, the wearable textile material 1330 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, nonwoven fabric, leather, cloth, a flexible polymer material, composite materials, etc.

One or more vibrotactile devices 1340 may be positioned at least partially within one or more corresponding pockets formed in the textile material 1330 of vibrotactile system 1300. The vibrotactile devices 1340 may be positioned in locations to provide a vibrating sensation (e.g., haptic feedback) to a user of the vibrotactile system 1300. For example, the vibrotactile devices 1340 may be positioned against the user's finger(s), thumb, or wrist, as shown in FIG. 13. The vibrotactile devices 1340 may, in some examples, be sufficiently flexible to conform to or bend with the user's corresponding body part(s).

A power source 1350 (e.g., a battery) for applying a voltage to the vibrotactile devices 1340 for activation thereof may be electrically coupled to the vibrotactile devices 1340, such as via conductive wiring 1352. In some examples, each of the vibrotactile devices 1340 may be independently electrically coupled to the power source 1350 for individual activation. In some embodiments, a processor 1360 may be operatively coupled to the power source 1350 and configured (e.g., programmed) to control activation of the vibrotactile devices 1340.

The vibrotactile system 1300 may be implemented in a variety of ways. In some examples, the vibrotactile system 1300 may be a standalone system with integral subsystems and components for operation independent of other devices and systems. As another example, the vibrotactile system 1300 may be configured for interaction with another device or system 1370. For example, the vibrotactile system 1300 may, in some examples, include a communications interface 1380 for receiving and/or sending signals to the other device or system 1370. The other device or system 1370 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. The communications interface 1380 may enable communications between the vibrotactile system 1300 and the other device or system 1370 via a wireless (e.g., Wi-Fi, BLUETOOTH, cellular, radio, etc.) link or a wired link. If present, the communications interface 1380 may be in communication with the processor 1360, such as to provide a signal to the processor 1360 to activate or deactivate one or more of the vibrotactile devices 1340.

The vibrotactile system 1300 may optionally include other subsystems and components, such as touch-sensitive pads 1390, pressure sensors, motion sensors, position sensors, lighting elements, and/or user interface elements (e.g., an on/off button, a vibration control element, etc.). During use, the vibrotactile devices 1340 may be configured to be activated for a variety of different reasons, such as in response to the user's interaction with user interface elements, a signal from the motion or position sensors, a signal from the touch-sensitive pads 1390, a signal from the pressure sensors, a signal from the other device or system 1370, etc.

Although the power source 1350, processor 1360, and communications interface 1380 are illustrated in FIG. 13 as being positioned in the haptic device 1320, the present disclosure is not so limited. For example, one or more of the power source 1350, processor 1360, or communications interface 1380 may be positioned within the haptic device 1310 or within another wearable textile.

Figure 14:
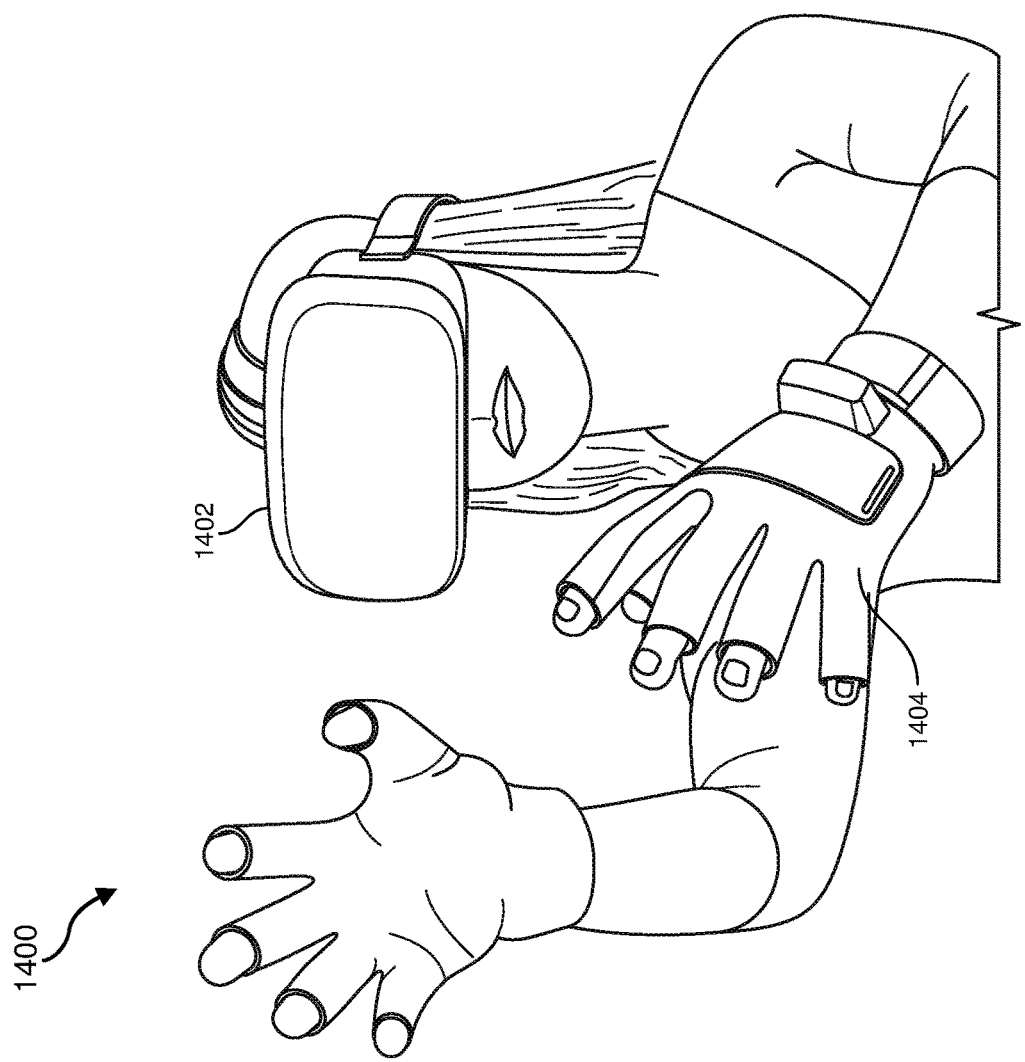
FIG. 14 is an illustration of an example virtual-reality environment according to embodiments of this disclosure.

Haptic wearables, such as those shown in and described in connection with FIG. 13, may be implemented in a variety of types of artificial-reality systems and environments. FIG. 14 shows an example artificial-reality environment 1400 including one head-mounted virtual-reality display and two haptic devices (i.e., gloves), and in other embodiments any number and/or combination of these components and other components may be included in an artificial-reality system. For example, in some embodiments there may be multiple head-mounted displays each having an associated haptic device, with each head-mounted display and each haptic device communicating with the same console, portable computing device, or other computing system.

Figure 12:
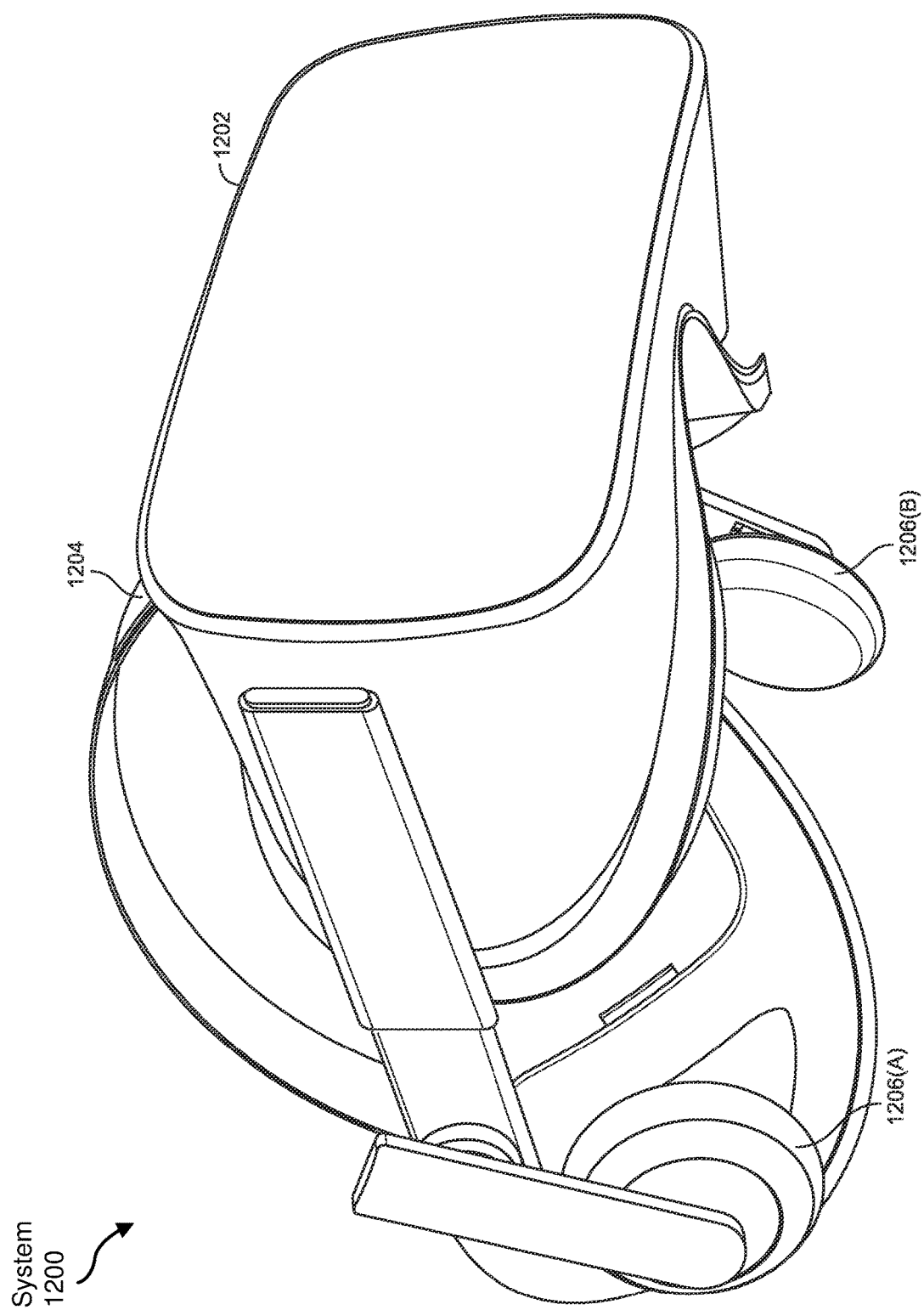
FIG. 12 is an illustration of an example virtual-reality headset that may be used in connection with embodiments of this disclosure.

The head-mounted display 1402 generally represents any type or form of virtual-reality system, such as the virtual-reality system 1200 in FIG. 12. The haptic device 1404 generally represents any type or form of wearable device, worn by a user of an artificial-reality system, that provides haptic feedback to the user to give the user the perception that he or she is physically engaging with a virtual object. In some embodiments, the haptic device 1404 may provide haptic feedback by applying vibration, motion, and/or force to the user. For example, the haptic device 1404 may limit or augment a user's movement. To give a specific example, the haptic device 1404 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use the haptic device 1404 to send action requests to a console. Examples of action requests include, without limitation, requests to start an application and/or end the application and/or requests to perform a particular action within the application.

Figure 15:
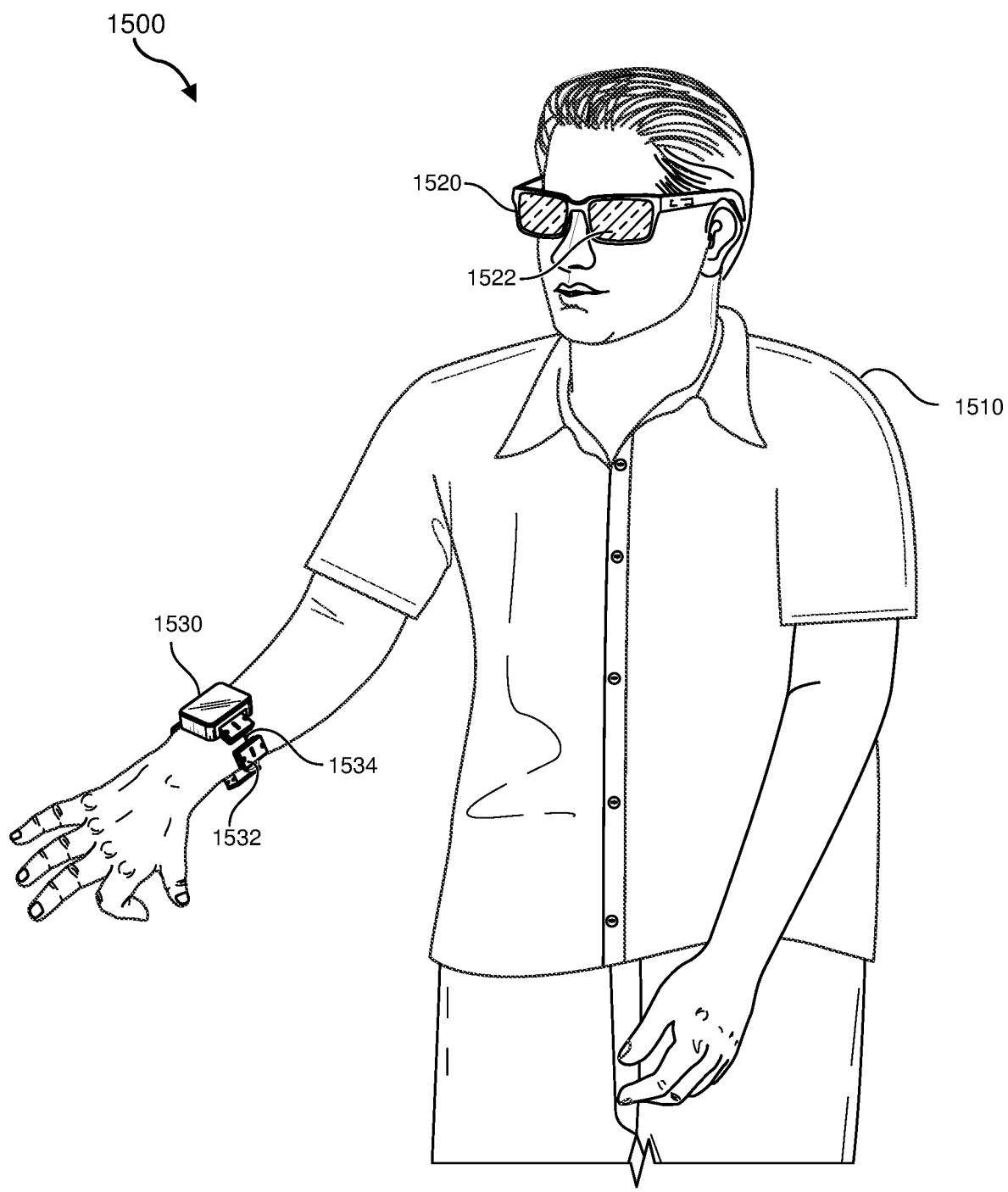
FIG. 15 is an illustration of an example augmented-reality environment according to embodiments of this disclosure.

While haptic interfaces may be used with virtual-reality systems, as shown in FIG. 14, haptic interfaces may also be used with augmented-reality systems, as shown in FIG. 15. FIG. 15 is a perspective view of a user 1510 interacting with an augmented-reality system 1500. In this example, user 1510 may wear a pair of augmented-reality glasses 1520 that may have one or more displays 1522 and that are paired with a haptic device 1530. In this example, the haptic device 1530 may be a wristband that includes a plurality of band elements 1532 and a tensioning mechanism 1534 that connects band elements 1532 to one another.

One or more of the band elements 1532 may include any type or form of actuator suitable for providing haptic feedback. For example, one or more of the band elements 1532 may be configured to provide one or more of various types of cutaneous feedback, including vibration, force, traction, texture, and/or temperature. To provide such feedback, the band elements 1532 may include one or more of various types of actuators. In one example, each of the band elements 1532 may include a vibrotactor (e.g., a vibrotactile actuator) configured to vibrate in unison or independently to provide one or more of various types of haptic sensations to a user. Alternatively, only a single band element or a subset of band elements may include vibrotactors.

The haptic devices 1310, 1320, 1404, and 1530 may include any suitable number and/or type of haptic transducer, sensor, and/or feedback mechanism. For example, the haptic devices 1310, 1320, 1404, and 1530 may include one or more mechanical transducers, piezoelectric transducers, and/or fluidic transducers. The haptic devices 1310, 1320, 1404, and 1530 may also include various combinations of different types and forms of transducers that work together or independently to enhance a user's artificial-reality experience. In one example, each of the band elements 1532 of the haptic device 1530 may include a vibrotactor (e.g., a vibrotactile actuator) configured to vibrate in unison or independently to provide one or more of various types of haptic sensations to a user.

The following example embodiments are also included in the present disclosure.

Example 1: A fluidic device, which may include: a monolithic gate substrate, including: a gate chamber formed in the monolithic gate substrate; and a flexible membrane that is part of the monolithic gate substrate, the flexible membrane located adjacent to the gate chamber; and a channel substrate coupled to the monolithic gate substrate, the channel substrate including: a source channel in fluid communication with the flexible membrane on an opposite side of the flexible membrane from the gate chamber; and a drain channel in fluid communication with the flexible membrane on the opposite side of the flexible membrane from the gate chamber.

Example 2: The fluidic device of Example 1, wherein the monolithic gate substrate, including the flexible membrane, includes a glass material.

Example 3: The fluidic device of Example 1 or Example 2, wherein the monolithic gate substrate, including the flexible membrane, includes a silicon dioxide material.

Example 4: The fluidic device of any of Examples 1 through 3, wherein the monolithic gate substrate and the channel substrate are coupled to each other via a weld.

Example 5: The fluidic device of any of Examples 1 through 4, wherein the monolithic gate substrate and the channel substrate are coupled to each other via an adhesive.

Example 6: The fluidic device of any of Examples 1 through 5, wherein the flexible membrane has a thickness of less than 200 µm.

Example 7: The fluidic device of any of Examples 1 through 6, wherein the flexible membrane has a thickness of less than 100 µm.

Example 8: The fluidic device of any of Examples 1 through 7, wherein the flexible membrane has a diameter of about 2 mm or less.

Example 9: The fluidic device of any of Examples 1 through 8, wherein the flexible membrane has a diameter of about 1 mm or less.

Example 10: The fluidic device of any of Examples 1 through 9, wherein the flexible membrane is configured to abut against the channel substrate to restrict passage of fluid from the source channel to the drain channel upon application of a pressure in the gate chamber and to allow passage of fluid from the source channel to the drain channel upon removal of the pressure in the gate chamber.

Example 11: The fluidic device of any of Examples 1 through 10, further including a standoff material positioned on the flexible membrane between the flexible membrane and the channel substrate, wherein the standoff material causes the flexible membrane to curve away from the channel substrate.

Example 12: The fluidic device of any of Examples 1 through 11, wherein each of a first sealing surface of the monolithic gate substrate facing the channel substrate and a second sealing surface of the channel substrate facing the monolithic gate substrate exhibits a polished finish.

Example 13: The fluidic device of any of Examples 1 through 12, wherein the flexible membrane is pre-curved to be biased toward the channel substrate.

Example 14: The fluidic device of Example 13, wherein the flexible membrane is pre-curved via exposure to laser light.

Example 15: The fluidic device of any of Examples 1 through 14, wherein the monolithic gate substrate further includes: an enlarged gate membrane on an opposite side of the gate chamber from the flexible membrane, wherein the enlarged gate membrane has a surface area that is larger than a surface area of the flexible membrane; and a shaft extending between the enlarged gate membrane and the flexible membrane.

Example 16: A fluidic device, including: a monolithic gate substrate, including a flexible membrane configured to flex between a closed position and an open position; and a channel substrate coupled to the monolithic gate substrate, the channel substrate including: a source channel in fluid communication with the flexible membrane; and a drain channel in fluid communication with the flexible membrane, wherein the source channel is in fluid communication with the drain channel when the flexible membrane is in the open position and the source channel is not in fluid communication with the drain channel when the flexible membrane is in the closed position.

Example 17: The fluidic device of Example 16, wherein each of the monolithic gate substrate and the channel substrate includes a glass material.

Example 18: The fluidic device of Example 16 or Example 17, further including a standoff material positioned on the flexible membrane between the flexible membrane and the channel substrate.

Example 19: The fluidic device of Example 18, wherein the standoff material includes at least one of: a polymer material; a metal material; an oxide material; or a nitride material.

Example 20: A method of forming a fluidic device, the method including: forming a gate chamber within a monolithic gate substrate while leaving a flexible membrane that is part of the monolithic gate substrate adjacent to the gate chamber; forming a source channel and a drain channel in a channel substrate; and coupling the channel substrate to the monolithic gate substrate with the source channel and the drain channel in fluid communication with the flexible membrane on an opposite side of the flexible membrane from the gate chamber.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A fluidic device, comprising:
   a monolithic gate substrate, comprising:
      a gate chamber formed in the monolithic gate substrate; and
      a flexible membrane that is part of the monolithic gate substrate, the flexible membrane located adjacent to the chamber;
   a channel substrate coupled to the monolithic gate substrate, the channel substrate comprising:
      a source channel in fluid communication with the flexible membrane on an opposite side of the flexible membrane from the gate chamber; and
      a drain channel in fluid communication with the flexible membrane on the opposite side of the flexible membrane from the gate chamber; and
   a standoff material positioned on the flexible membrane between the flexible membrane and the channel substrate, wherein the standoff material causes the flexible membrane to curve away from the channel substrate.

2. The fluidic device of claim 1, wherein the monolithic gate substrate, including the flexible membrane, comprises a glass material.

3. The fluidic device of claim 1, wherein the monolithic gate substrate, including the flexible membrane, comprises a silicon dioxide material.

4. The fluidic device of claim 1, wherein the monolithic gate substrate and the channel substrate are coupled to each other via a weld.

5. The fluidic device of claim 1, wherein the monolithic gate substrate and the channel substrate are coupled to each other via an adhesive.

6. The fluidic device of claim 1, wherein the flexible membrane has a thickness of less than 200 μm.

7. The fluidic device of claim 1, wherein the flexible membrane has a thickness of less than 100 μm.

8. The fluidic device of claim 1, wherein the flexible membrane has a diameter of about 2 mm or less.

9. The fluidic device of claim 1, wherein the flexible membrane has a diameter of about 1 mm or less.

10. The fluidic device of claim 1, wherein the flexible membrane is configured to abut against the channel substrate to restrict passage of fluid from the source channel to the drain channel upon application of a pressure in the gate chamber and to allow passage of fluid from the source channel to the drain channel upon removal of the pressure in the gate chamber.

11. The fluidic device of claim 1, wherein each of a first sealing surface of the monolithic gate substrate facing the channel substrate and a second sealing surface of the channel substrate facing the monolithic gate substrate exhibits a polished finish.

12. The fluidic device of claim 1, wherein the flexible membrane is pre-curved to be biased toward the channel substrate.

13. The fluidic device of claim 12, wherein the flexible membrane is pre-curved via exposure to laser light.

14. The fluidic device of claim 1, wherein the monolithic gate substrate further comprises:
   an enlarged gate membrane on an opposite side of the gate chamber from the flexible membrane, wherein the enlarged gate membrane has a surface area that is larger than a surface area of the flexible membrane; and
   a shaft extending between the enlarged gate membrane and the flexible membrane.

15. A fluidic device, comprising:
   a monolithic gate substrate, comprising a flexible membrane configured to flex between a closed position and an open position, wherein the flexible membrane has a diameter of about 2 mm or less; and
   a channel substrate coupled to the monolithic gate substrate, the channel substrate comprising:
      a source channel in fluid communication with the flexible membrane; and
      a drain channel in fluid communication with the flexible membrane,
   wherein the source channel is in fluid communication with the drain channel when the flexible membrane is in the open position and the source channel is not in fluid communication with the drain channel when the flexible membrane is in the closed position.

16. The fluidic device of claim 15, wherein each of the monolithic gate substrate and the channel substrate comprises a glass material.

17. The fluidic device of claim 15, further comprising a standoff material positioned on the flexible membrane between the flexible membrane and the channel substrate.

18. The fluidic device of claim 17, wherein the standoff material comprises at least one of: a polymer material; a metal material; an oxide material; or a nitride material.

19. A fluidic device, comprising:
   a monolithic gate substrate, comprising:
      a gate chamber formed in the monolithic gate substrate; and
      a flexible membrane that is part of the monolithic gate substrate, the flexible membrane located adjacent to the gate chamber; and
   a channel substrate coupled to the monolithic gate substrate, the channel substrate comprising:
      a source channel in fluid communication with the flexible membrane on an opposite side of the flexible membrane from the gate chamber; and
      a drain channel in fluid communication with the flexible membrane on the opposite side of the flexible membrane from the gate chamber,
   wherein the flexible membrane is pre-curved to be biased toward the channel substrate.

20. The fluidic device of claim 19, wherein the flexible membrane has a diameter of about 2 mm or less.

21. The fluidic device of claim 19, wherein the monolithic gate substrate further comprises: an enlarged gate membrane on an opposite side of the gate chamber from the flexible membrane, wherein the enlarged gate membrane has a surface area that is larger than a surface area of the flexible membrane; and a shaft extending between the enlarged gate membrane and the flexible membrane.

* * * * *